US012680615B2

(12) United States Patent
Mitri et al.

(10) Patent No.: US 12,680,615 B2
(45) Date of Patent: Jul. 14, 2026

(54) MULTI-WAY VALVE WITH SINGLE VALVE ROTOR

(71) Applicant: Stant USA Corp., Connersville, IN (US)

(72) Inventors: George J. Mitri, Connersville, IN (US); John C. Long, Connersville, IN (US); Rick McQuiston, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 92 days.

(21) Appl. No.: 18/409,290

(22) Filed: Jan. 10, 2024

(65) Prior Publication Data

US 2024/0229946 A1    Jul. 11, 2024

Related U.S. Application Data

(60) Provisional application No. 63/438,115, filed on Jan. 10, 2023.

(51) Int. Cl.
| | |
|---|---|
| *F16K 11/085* | (2006.01) |
| *F16K 5/04* | (2006.01) |
| *F16K 5/08* | (2006.01) |
| *F16K 5/18* | (2006.01) |
| *F16K 27/06* | (2006.01) |

(52) U.S. Cl.
CPC ........ *F16K 11/0856* (2013.01); *F16K 5/0471* (2013.01); *F16K 5/08* (2013.01); *F16K 5/18* (2013.01); *F16K 11/085* (2013.01); *F16K 27/065* (2013.01)

(58) Field of Classification Search
CPC .. F16K 11/0856; F16K 27/065; F16K 11/085; F16K 5/0471; F16K 5/08; F16K 5/18
See application file for complete search history.

(56) References Cited

U.S. PATENT DOCUMENTS

| | | | |
|---|---|---|---|
| 3,251,408 A | 5/1966 | Henry et al. | |
| 3,927,693 A | 12/1975 | Johnston | |
| 4,429,717 A | 2/1984 | Montgomery | |
| 5,431,189 A | 7/1995 | Jones | |
| 5,467,800 A * | 11/1995 | Sallas | F15B 21/125 |
| | | | 91/39 |
| 5,529,758 A | 6/1996 | Houston | |
| 6,186,174 B1 | 2/2001 | Yurchision et al. | |
| 6,245,233 B1 | 6/2001 | Lu | |
| 6,347,644 B1 | 2/2002 | Channell | |

(Continued)

FOREIGN PATENT DOCUMENTS

| | | |
|---|---|---|
| CN | 204610957 U | 9/2015 |
| CN | 107893865 A | 4/2018 |

(Continued)

*Primary Examiner* — Craig M Schneider
*Assistant Examiner* — Christopher D Ballman
(74) *Attorney, Agent, or Firm* — Barnes & Thornburg

(57) ABSTRACT

A multi-way valve adapted to control a flow of fluid to different thermal fluid circuits includes a valve housing, a valve flow controller, and a sealing system. The valve flow controller is arranged in the valve housing to control flow through the valve housing. The sealing system is configured to seal between the valve housing and the valve flow controller.

14 Claims, 34 Drawing Sheets

(56)                References Cited

U.S. PATENT DOCUMENTS

| | | | |
|---|---|---|---|
| 6,568,428 B2 * | 5/2003 | Pecci | F16K 27/003 |
| | | | 137/595 |
| 8,336,319 B2 | 12/2012 | Johnston et al. | |
| 8,375,990 B2 | 2/2013 | Veros | |
| 8,402,776 B2 | 3/2013 | Johnston et al. | |
| 8,448,696 B2 | 5/2013 | Johnston et al. | |
| 9,611,946 B1 * | 4/2017 | Potter | F16K 31/041 |
| 9,777,469 B2 | 10/2017 | Wang | |
| 10,344,877 B2 | 7/2019 | Roche et al. | |
| 10,665,908 B2 | 5/2020 | Krull et al. | |
| 10,851,901 B2 | 12/2020 | Liberman et al. | |
| 10,967,702 B2 | 4/2021 | Mancini et al. | |
| 11,084,404 B2 | 8/2021 | Gupta et al. | |
| 11,168,797 B2 | 11/2021 | Dragojlov et al. | |
| 11,247,529 B2 | 2/2022 | Zhou et al. | |
| 11,383,578 B2 | 7/2022 | Huang et al. | |
| 2006/0118066 A1 | 6/2006 | Martins | |
| 2006/0231146 A1 | 10/2006 | Lillback | |
| 2008/0223464 A1 | 9/2008 | Merrell | |
| 2010/0319796 A1 | 12/2010 | Whitaker | |
| 2014/0053931 A1 | 2/2014 | Whitaker | |
| 2014/0090414 A1 | 4/2014 | Mclane et al. | |
| 2015/0354716 A1 | 12/2015 | Morein | |
| 2017/0089474 A1 | 3/2017 | Zhan et al. | |
| 2019/0039440 A1 | 2/2019 | Calderone | |
| 2020/0011437 A1 | 1/2020 | Lin et al. | |
| 2021/0331554 A1 | 10/2021 | Mancini et al. | |
| 2022/0146003 A1 | 5/2022 | Yu et al. | |
| 2022/0390026 A1 * | 12/2022 | Chapman | F16K 27/06 |

FOREIGN PATENT DOCUMENTS

| | | | |
|---|---|---|---|
| CN | 106090315 B | 8/2018 | |
| CN | 112682541 A | 4/2021 | |
| CN | 214743520 U | 11/2021 | |
| CN | 214946603 U | 11/2021 | |
| CN | 214999563 U | 12/2021 | |
| CN | 215059741 U | 12/2021 | |
| CN | 215950468 U | 3/2022 | |
| CN | 114688306 A | 7/2022 | |
| CN | 217207877 U | 8/2022 | |
| CN | 217539713 U | 10/2022 | |
| CN | 114635991 B | 3/2023 | |
| CN | 220102162 A | 11/2023 | |
| CN | 221780053 U | 9/2024 | |
| DE | 10153222 B4 | 7/2012 | |
| DE | 202014102795 U1 | 6/2014 | |
| DE | 102021101096 A1 | 7/2022 | |
| JP | H1144369 A | 2/1999 | |
| JP | 2002022041 A | 1/2002 | |
| WO | 2022057588 A1 | 3/2022 | |

* cited by examiner

THERMAL FLUID CIRCUITS

| MODE | LOOP 1 | LOOP 2 | DISCONNECT |
|------|--------|--------|------------|
| A | 1, 2 | 5, 3 | 4 |
| B | 1, 2 | 3, 5 | 4 |
| C | 1, 4 | 2, 3 | 5 |
| D | ALL PORT CONNECT | | |

*FIG. 7*

VALVE ROTOR
(SECOND POSITION)

MULTI-WAY VALVE WITH SINGLE VALVE ROTOR

PRIORITY CLAIM

This application claims priority to and the benefit of U.S. Provisional Patent Application No. 63/438,115, filed 10 Jan. 2023, the disclosure of which is now expressly incorporated herein by reference.

TECHNICAL FIELD

The present disclosure relates to multi-way valves, and particularly to multi-way valves for controlling the flow of heating and/or cooling fluid to various thermal fluid circuits in a vehicle. More particularly, the present disclosure relates to an electro mechanical multi-way valve.

BACKGROUND

Multi-way valves are used for controlling the flow of fluid to various thermal fluid circuits in a vehicle. However, there is a need for multi-way valves with an increased number of possible flow paths and improved sealing.

SUMMARY

The present disclosure provides a multi-way valve that controls the flow of heating and/or cooling fluid to different thermal fluid circuits in a vehicle with improved sealing. The multi-way valve may include a valve housing and a valve flow controller positioned in the housing to control the flow of fluid through the valve housing. The flow of heating and/or cooling fluid may be controlled to direct fluid to different thermal fluid circuits in a vehicle.

According to an aspect of the present disclosure, the valve housing may include a valve housing body coupled to a manifold of the thermal fluid circuits and a housing end cover. The valve housing body may be shaped to define a valve cavity and a plurality of apertures that open into the valve cavity. The housing end cover may be coupled to the first end of the valve housing to close a first end opening to the valve cavity.

According to an aspect of the present disclosure, the valve flow controller may include a valve rotor arranged in the valve cavity of the valve housing body. The valve rotor may be configured to rotate relative to the valve housing body about a valve axis. The valve rotor may cooperate with the valve housing to define a plurality of flow paths in the valve housing when the valve rotor is rotated about the valve axis to control the flow of fluid through the valve housing.

According to an aspect of the present disclosure, the valve flow controller of the multi-way valve may further include an actuator coupled to the valve rotor to control rotation of the valve rotor about the axis. The actuator may rotate the valve rotor to different predetermined positions relative to the valve housing to establish different flow paths through the housing.

According to an aspect of the present disclosure, the multi-way valve may further include a sealing system configured to form a seal engagement between the valve rotor and the valve housing body of the valve housing. The sealing system may include a seal that extends circumferentially partway around the valve axis and is located between the valve rotor and the valve housing body.

According to an aspect of the present disclosure, the sealing system may further include a biasing assembly configured to apply a radial force on the valve rotor when the valve rotor is in preselected positions relative to the valve housing body. The biasing assembly may selectively apply the radial force to the valve rotor to urge the valve rotor into a predetermined level of engagement with the seal when the valve rotor is in one of the different preselected positions.

With the multi-way valve of the present disclosure, a multi-way valve with an increased number of flow paths and improved sealing is provided. The valve rotor may be rotated about the valve axis and cooperate with the valve housing to define the increased number of flow paths. This arrangement improves sealing between the plurality of apertures in the valve housing body and the plurality of chambers in the valve rotor not only because the flow path is less complicated, but the sealing system also uses less material for the seal and reduces the friction on the valve rotor. The increased engagement of the valve rotor with the corresponding seal also improves sealing between the valve rotor and the valve housing body and reduces leakage therebetween. This increased engagement of the valve rotor with the corresponding seal applied only at preselected positions also reduces the amount of torque needed to rotate the valve rotors between various positions and reduces wear on the seals themselves.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective diagrammatic view of a multi-way valve configured to control the flow of fluid to various thermal fluid circuits in a vehicle;

FIG. 2 is an exploded view of the multi-way valve of FIG. 1 showing the multi-way valve includes a valve housing, a valve flow controller having a valve rotor configured to be arranged in a valve cavity of the valve housing to control a flow of fluid through the valve housing and an actuator coupled to the valve rotor to rotate the valve rotor about a valve axis, and a sealing system configured to seal between valve rotor of the valve flow controller and the valve housing;

FIG. 3 is an exploded view of the multi-way valve of FIG. 1 showing the valve housing includes a valve housing body and a housing end cover configured to be coupled to an open end of the valve housing body to close an end opening to a valve cavity formed in the valve housing body with the valve rotor arranged in the valve cavity;

FIG. 4 is an exploded view of the valve housing body and the valve flow controller included in the multi-way valve of FIG. 2 with a portion of the valve housing broken away to show the valve housing body includes an annular outer wall that extends around the valve axis to define the valve cavity, a housing base that extends from the annular outer wall and formed to define a plurality of apertures that extend radially through the housing base relative to the valve axis and open into the valve cavity, an end wall opposite the housing end cover, and a rod that extends axially away from the end wall into the valve cavity so that the rod extends into the valve rotor when the valve rotor is arranged in the valve cavity to provide support for one end of the valve rotor;

FIG. 5 is a perspective view of the valve rotor included in the valve flow controller of the multi-way valve of FIG. 1 showing the valve rotor includes a valve rotor body and a valve rotor shaft that extends axially from the valve rotor body to a terminal end configured to extend through the housing end cover to be couple to the actuator, and further showing the valve rotor body includes a valve rotor drum that extends circumferentially about the valve axis, a plurality of circumferential flow divider walls that extend circumferentially at least partway around the valve rotor drum, and a plurality of axial flow divider walls that extend axially along the valve rotor drum between the circumferential flow divider walls to form a plurality of chambers as shown in FIGS. 6A-6D;

FIG. 5A is a detail view of FIG. 5 showing the sealing system includes a biasing assembly having protrusions formed on the valve rotor that each extend radially outward from the valve rotor body to selectively engage the ridge on the valve housing body as suggested in FIGS. 18-19A as the valve rotor rotates about the valve axis to the different predetermined positions to form the biasing assembly configured to selectively apply a radial force on the valve rotor to urge the valve rotor into engagement with the seal located in the valve housing body when the valve rotor is in one of the different predetermined positions to improve sealing between the valve rotor and the valve housing body;

FIG. 7 is a table showing the different modes of the multi-way valve of FIG. 1 and the different flow paths created at each of the different modes A-D;

Figures 1, 2:
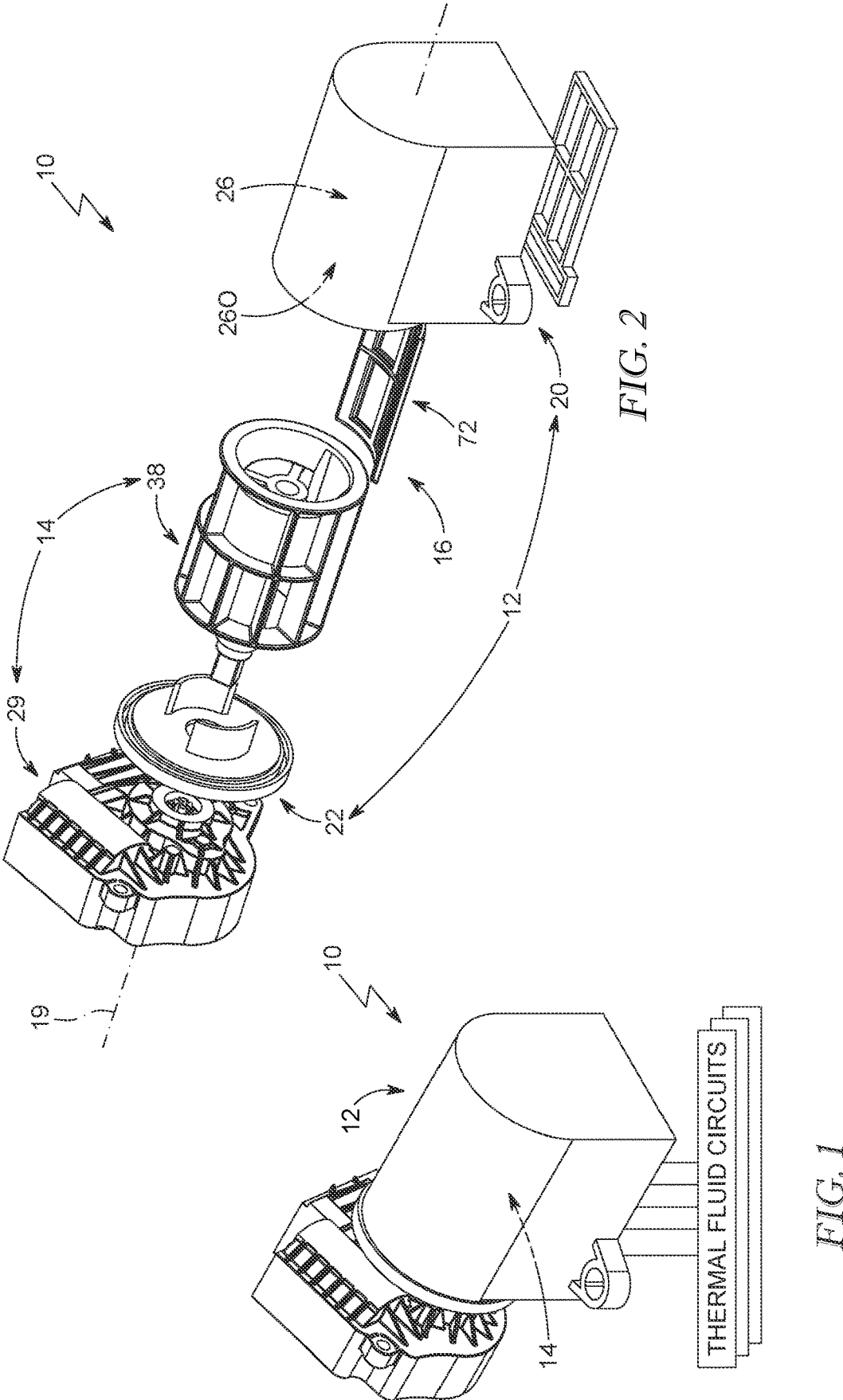
Figure 7A:
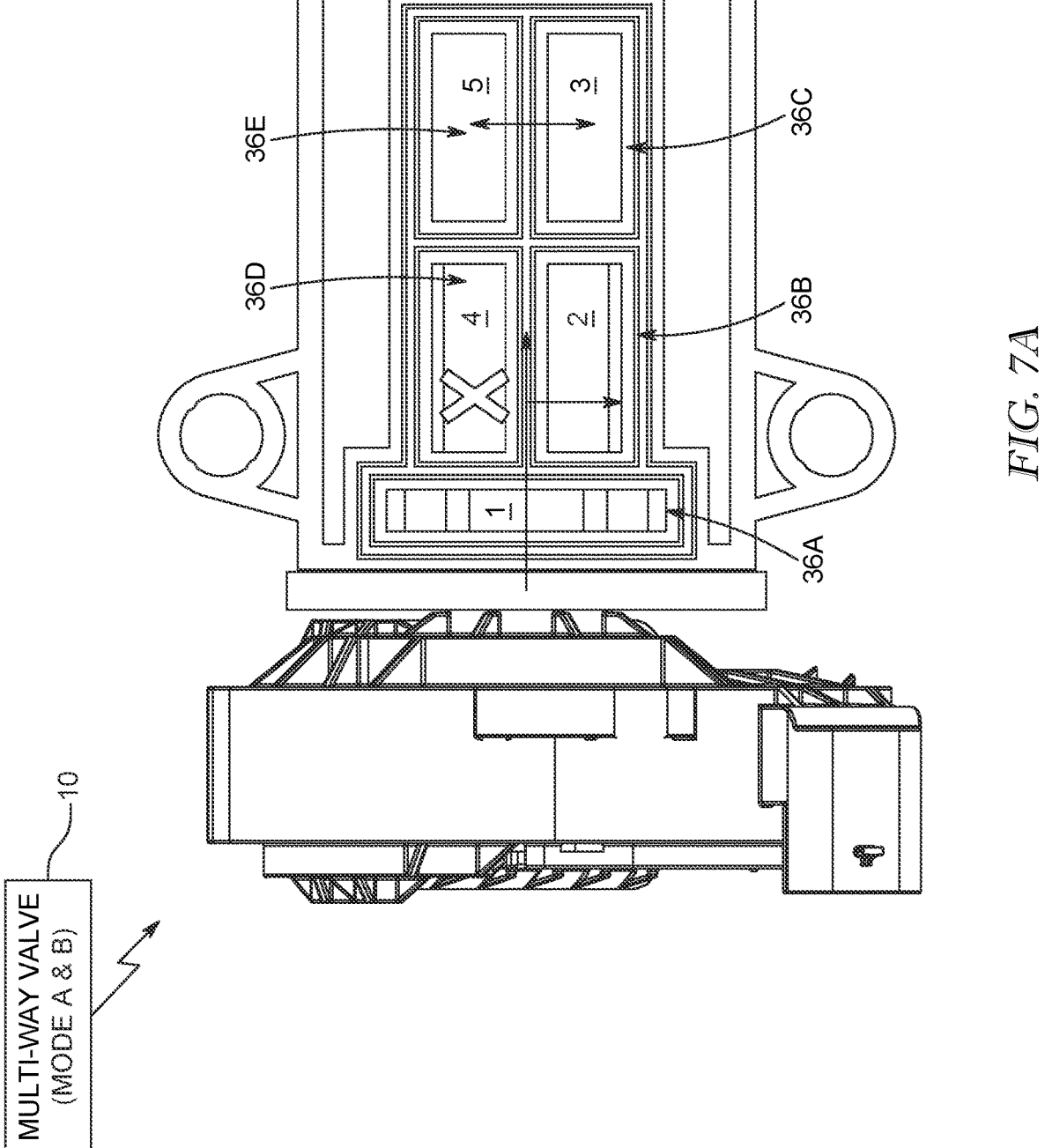
FIG. 7A is a bottom view of the multi-way valve in mode A or mode B as shown in FIG. 7 in which the valve rotor is in a VALVE ROTOR FIRST position as shown in FIG. 8.
Figure 7B:
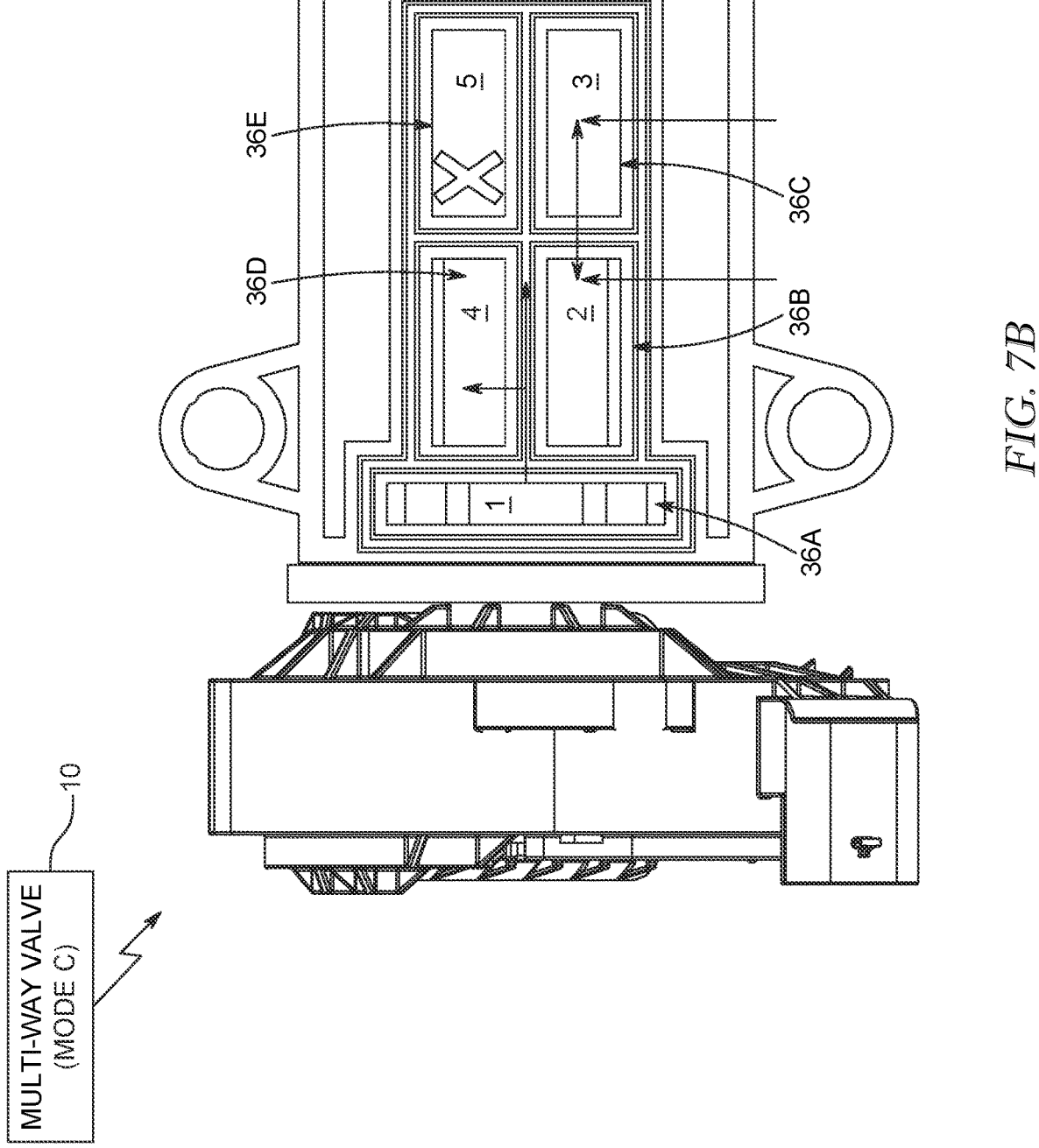
FIG. 7B is a bottom view of the multi-way valve in mode C as shown in FIG. 7 in which the valve rotor moves to a VALVE ROTOR SECOND position as shown in FIG. 10.
Figure 7C:
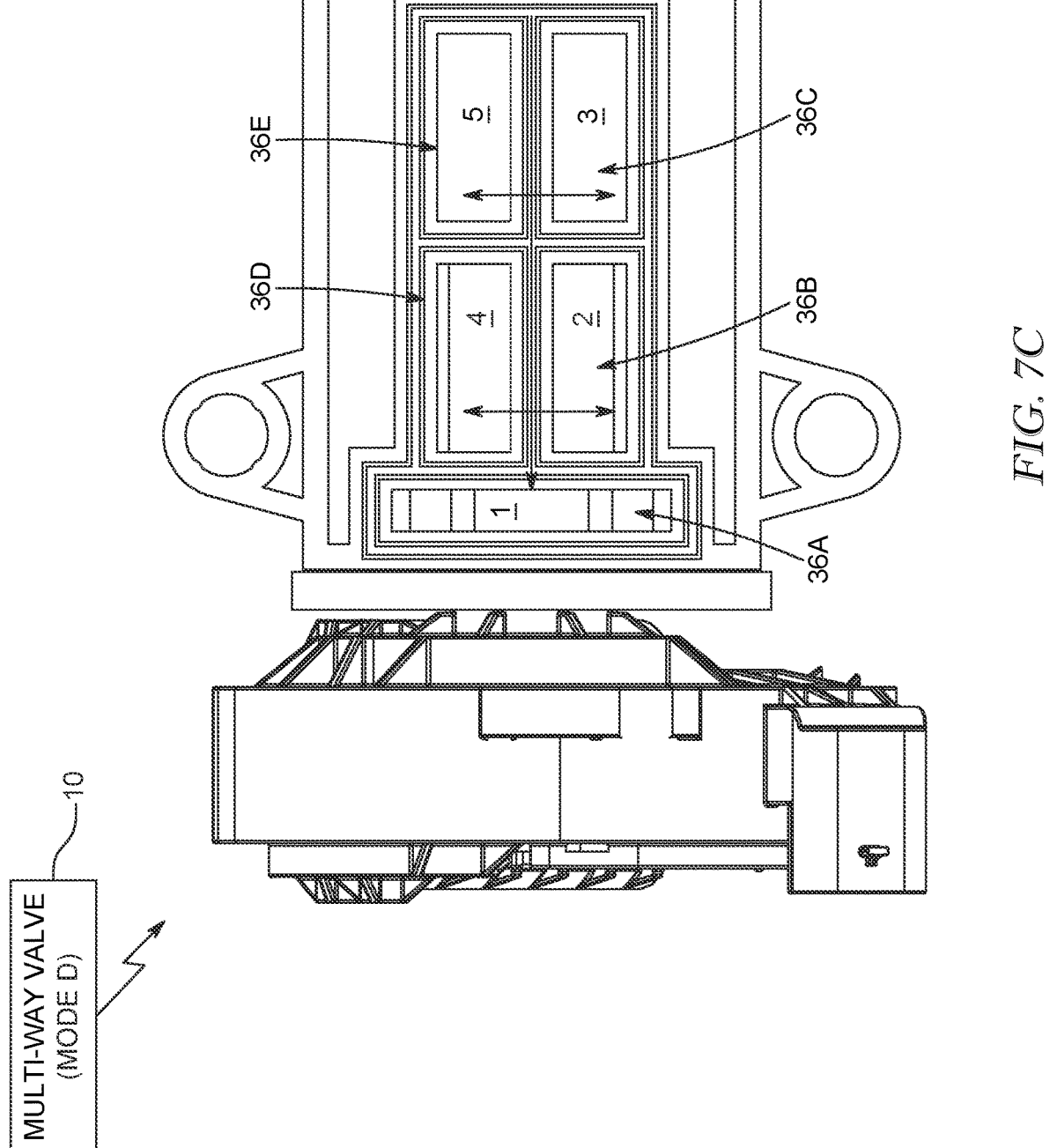
FIG. 7C is a bottom view of the multi-way valve in mode D as shown in FIG. 7 in which the valve rotor moves to a VALVE ROTOR THIRD position as shown in FIG. 12.
Figure 8:
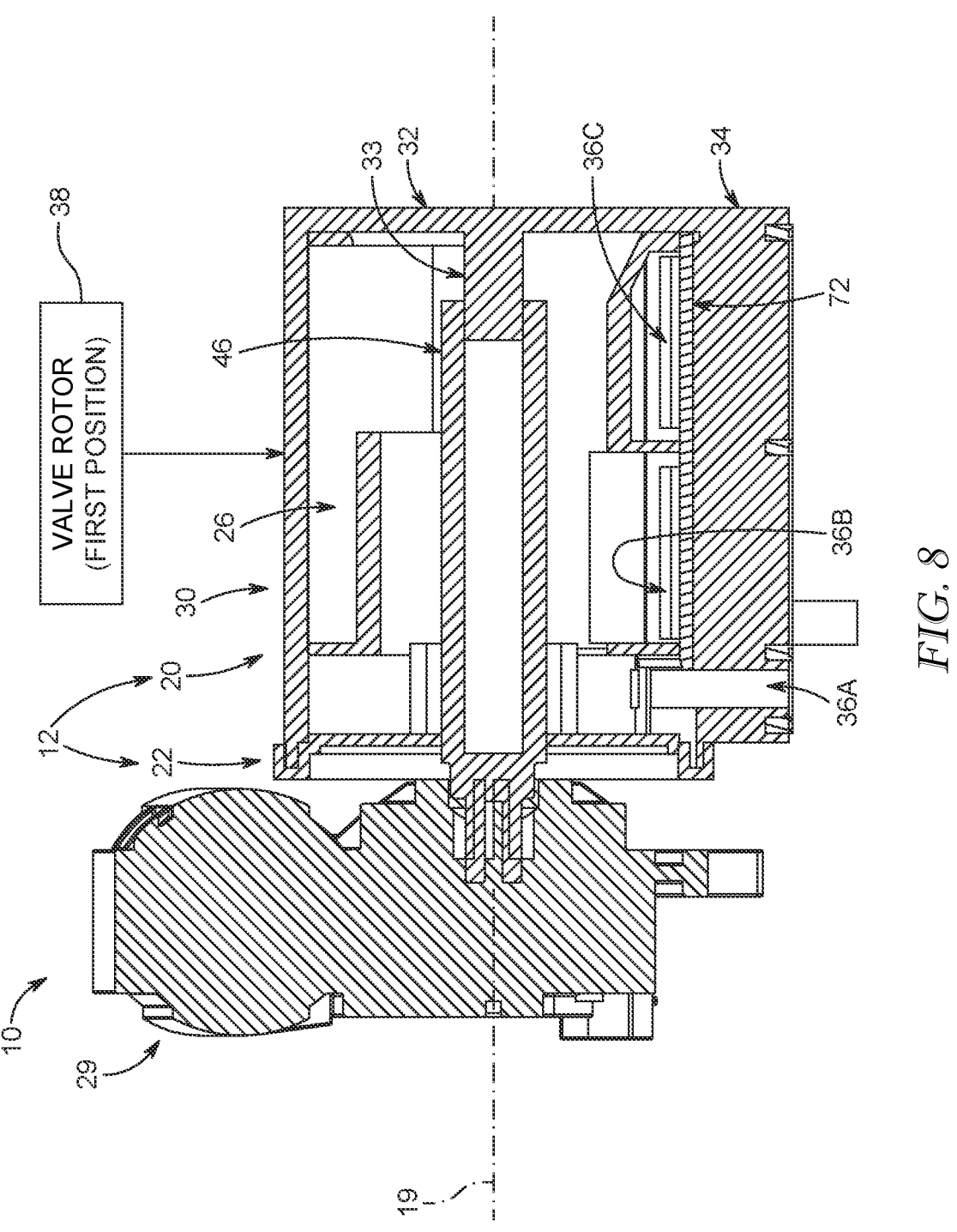
Figure 9A:
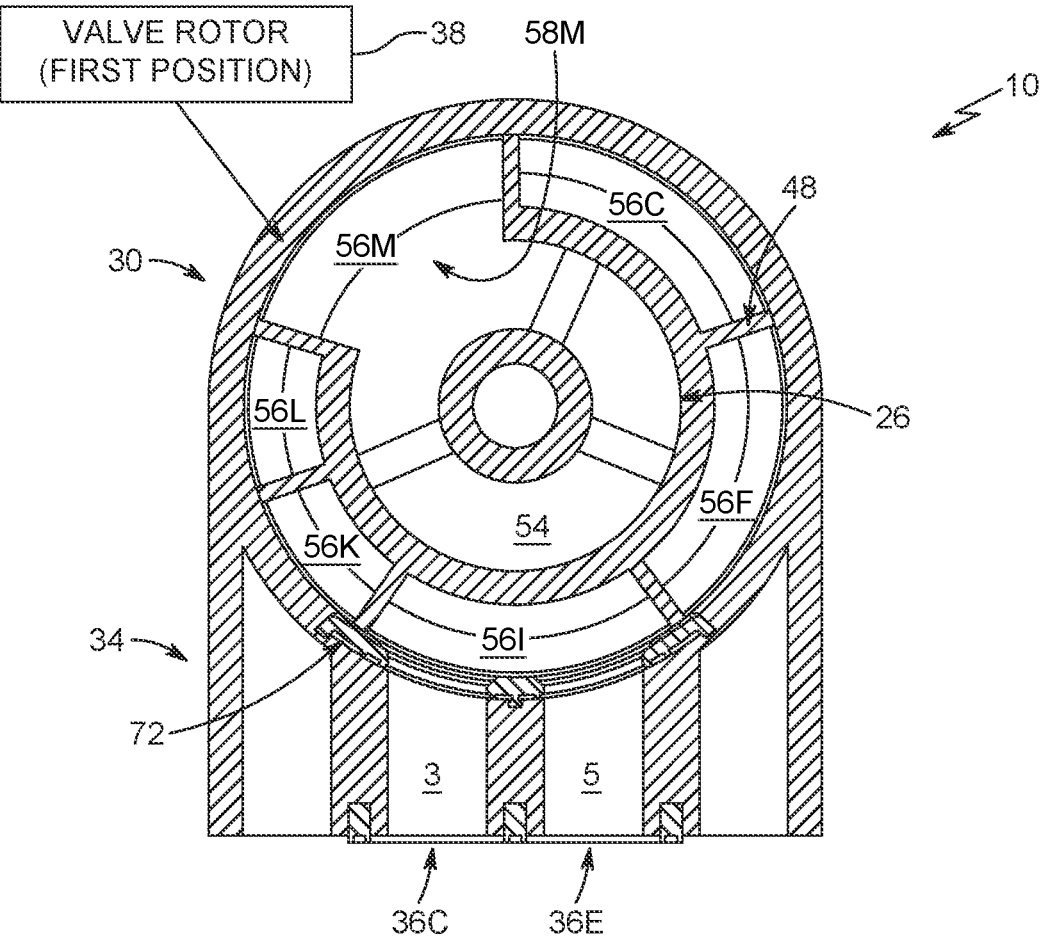
Figure 9B:
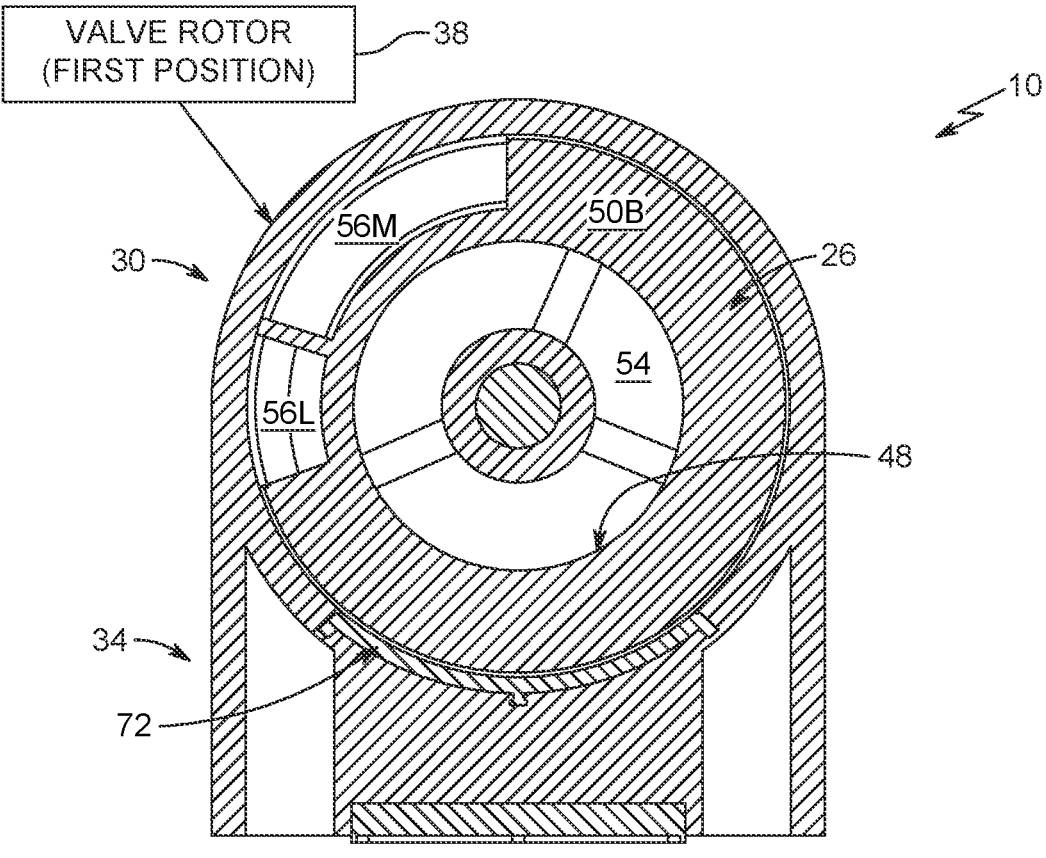
Figure 9C:
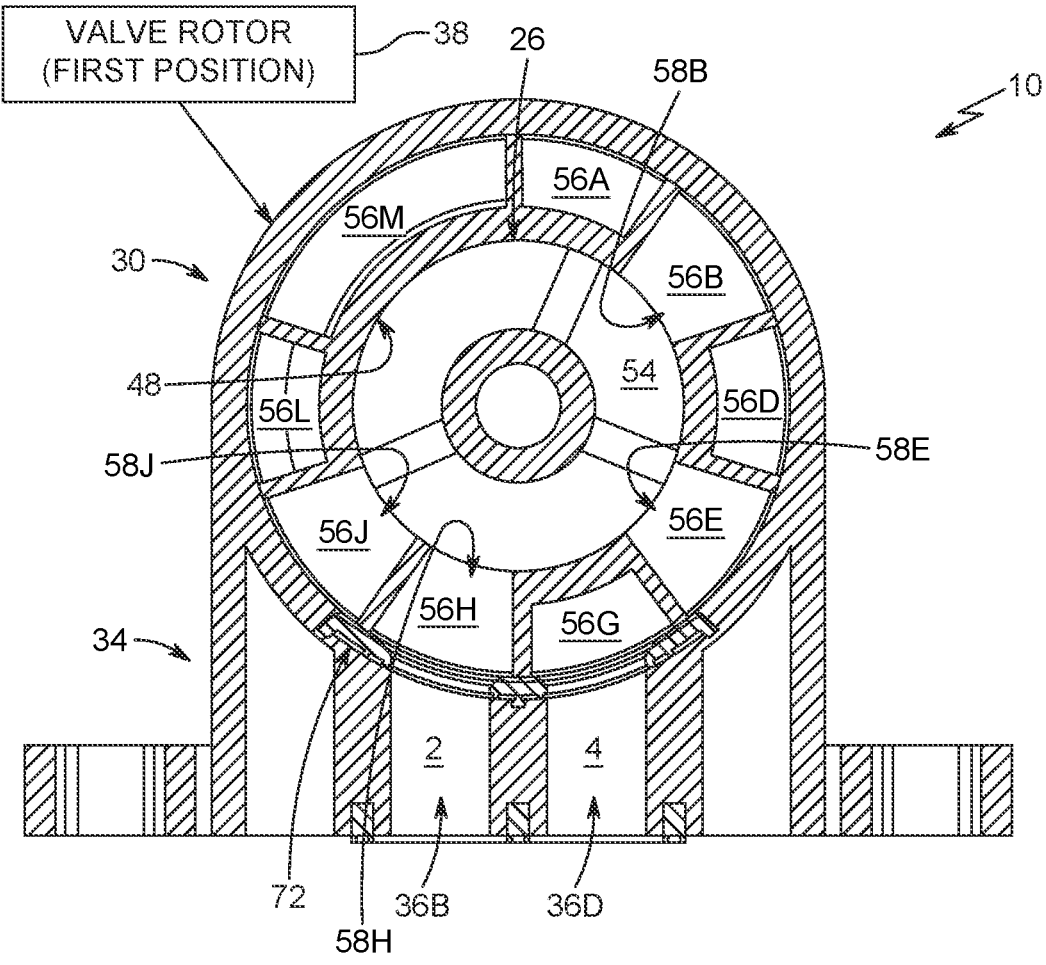
Figure 10:
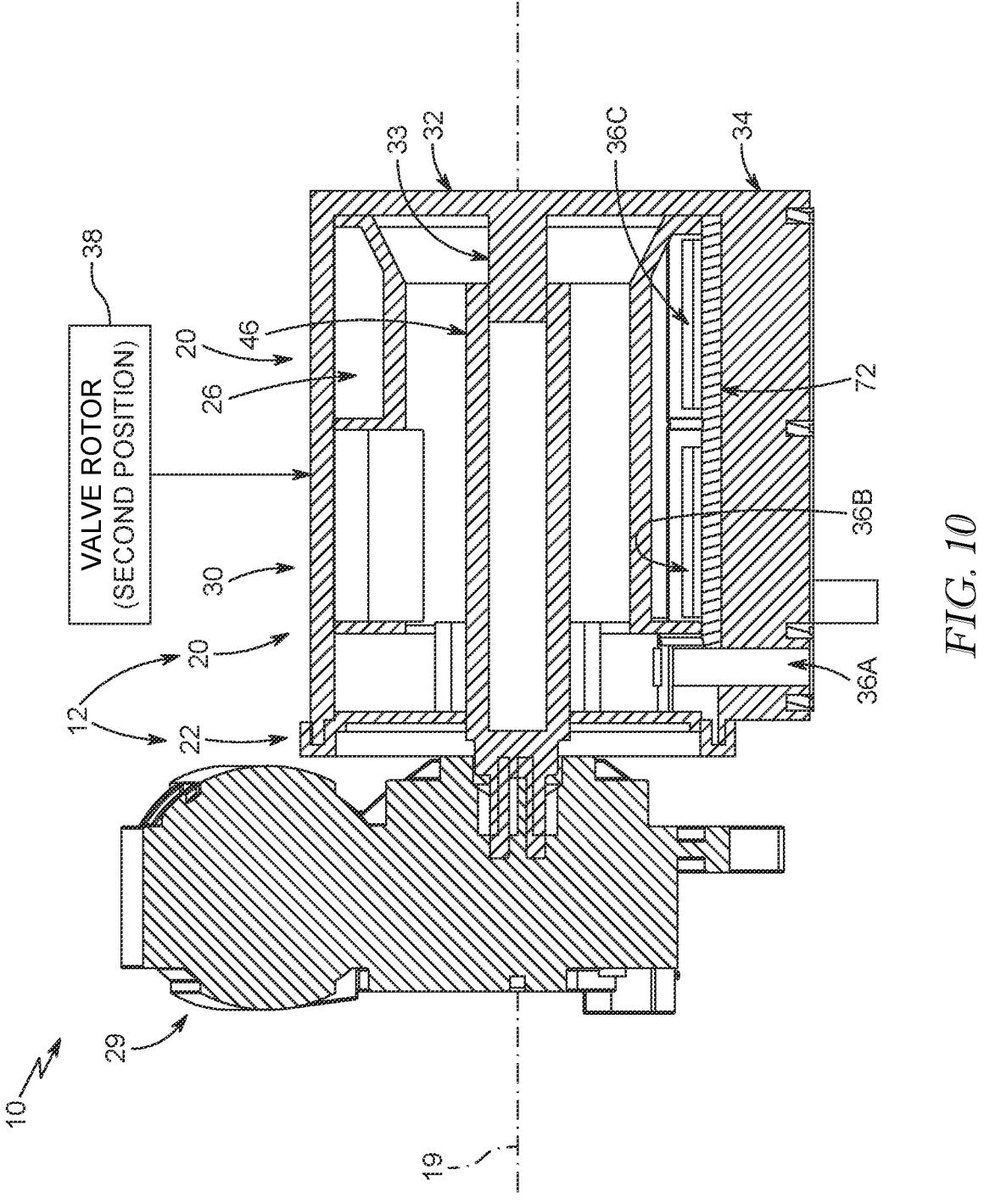
Figure 11A:
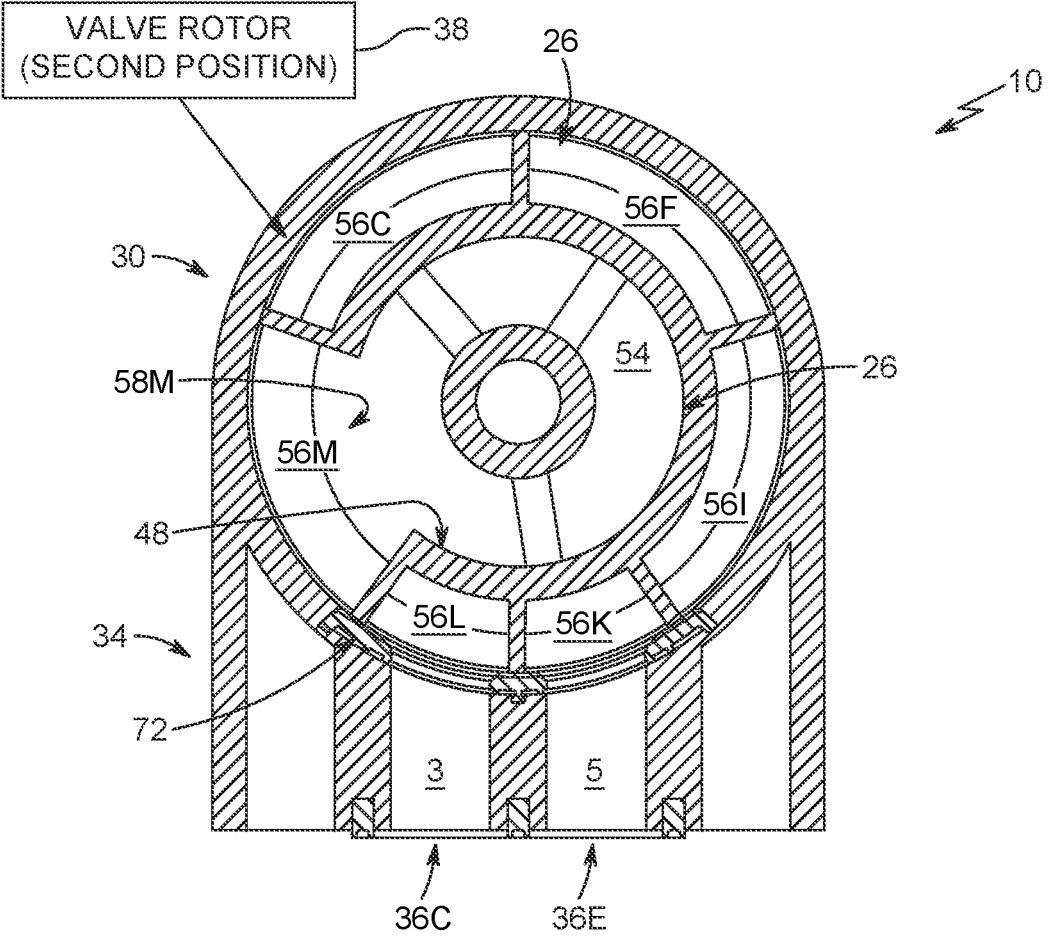
Figure 11B:
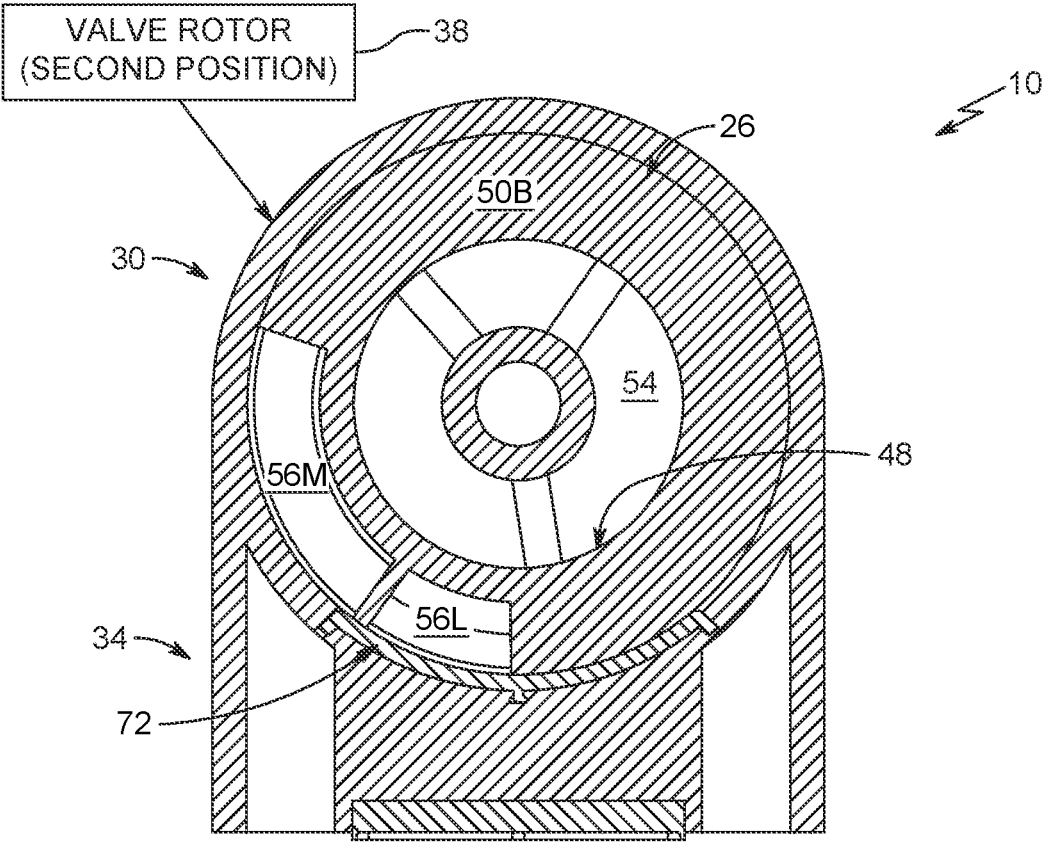
Figure 11C:
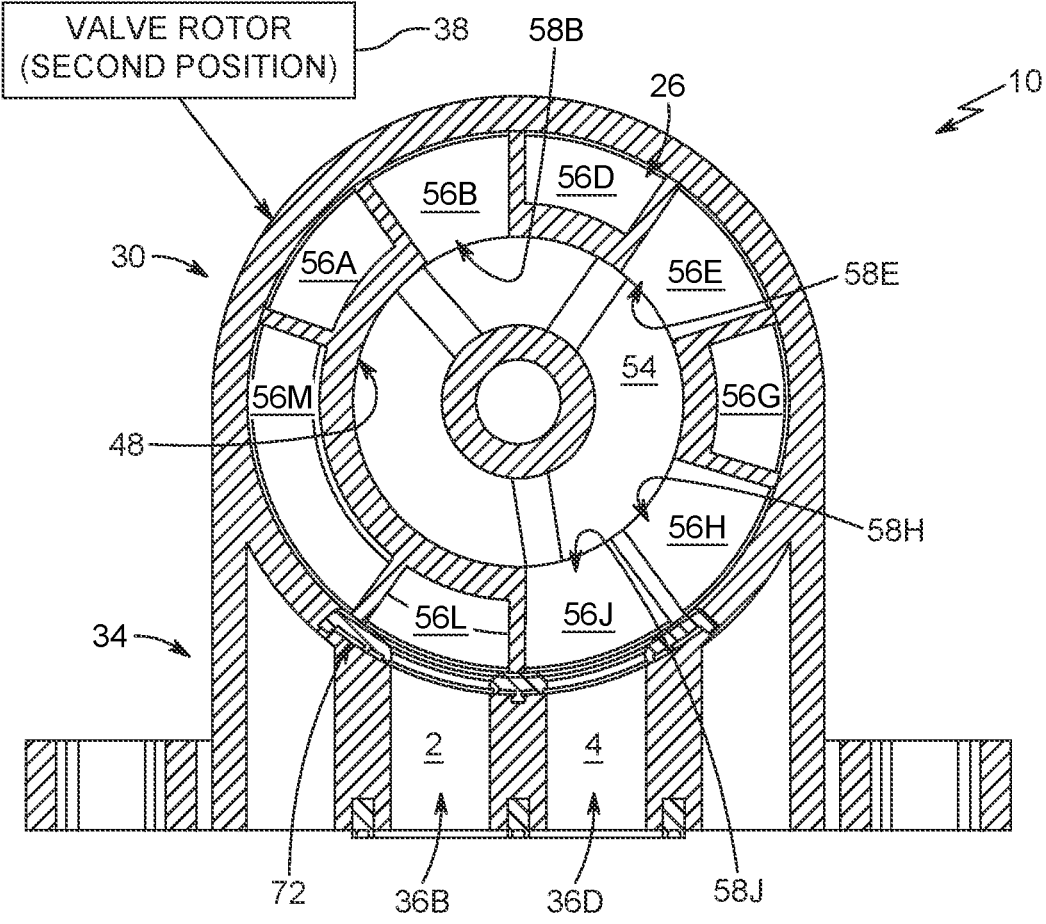
Figure 12:
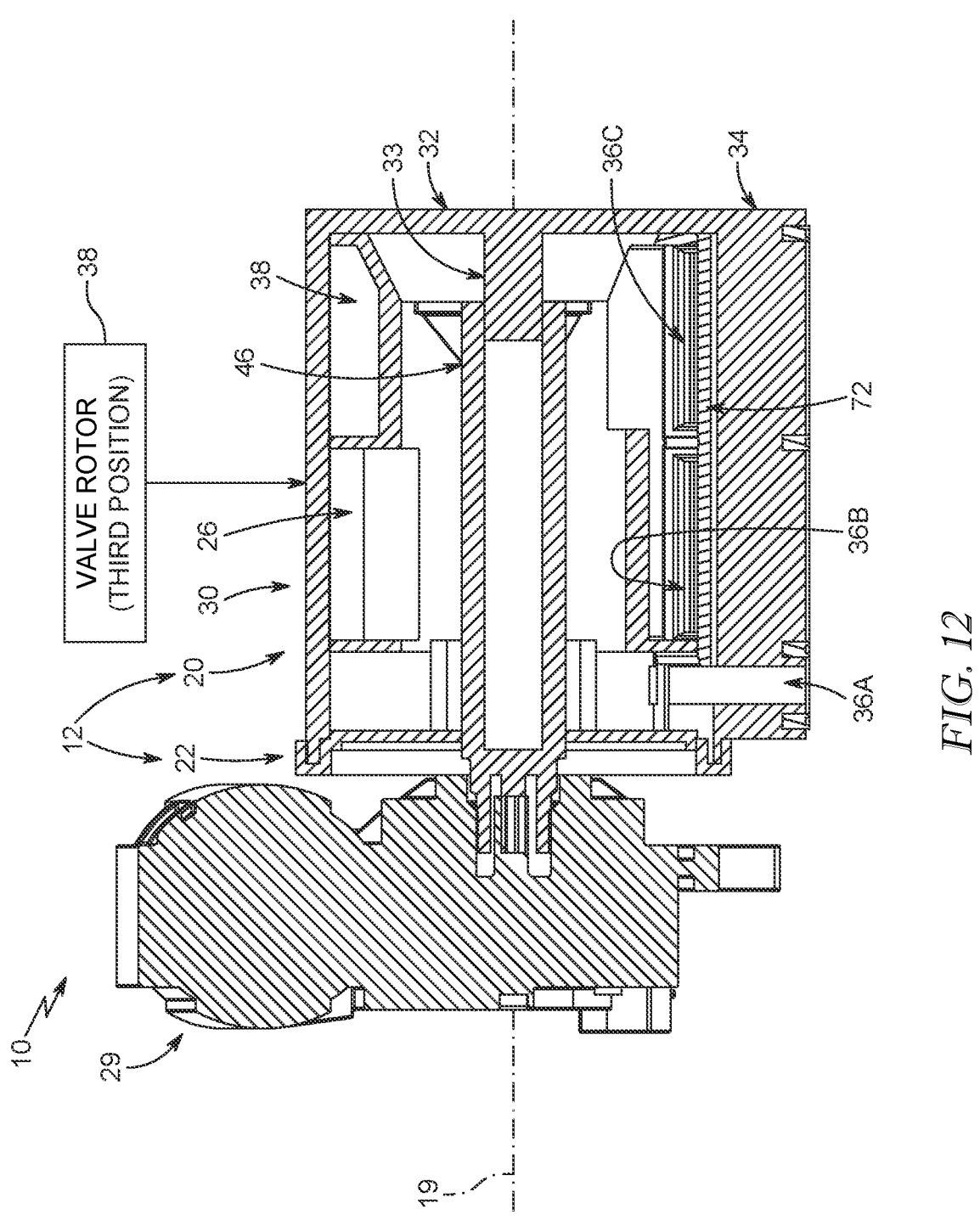
Figure 13A:
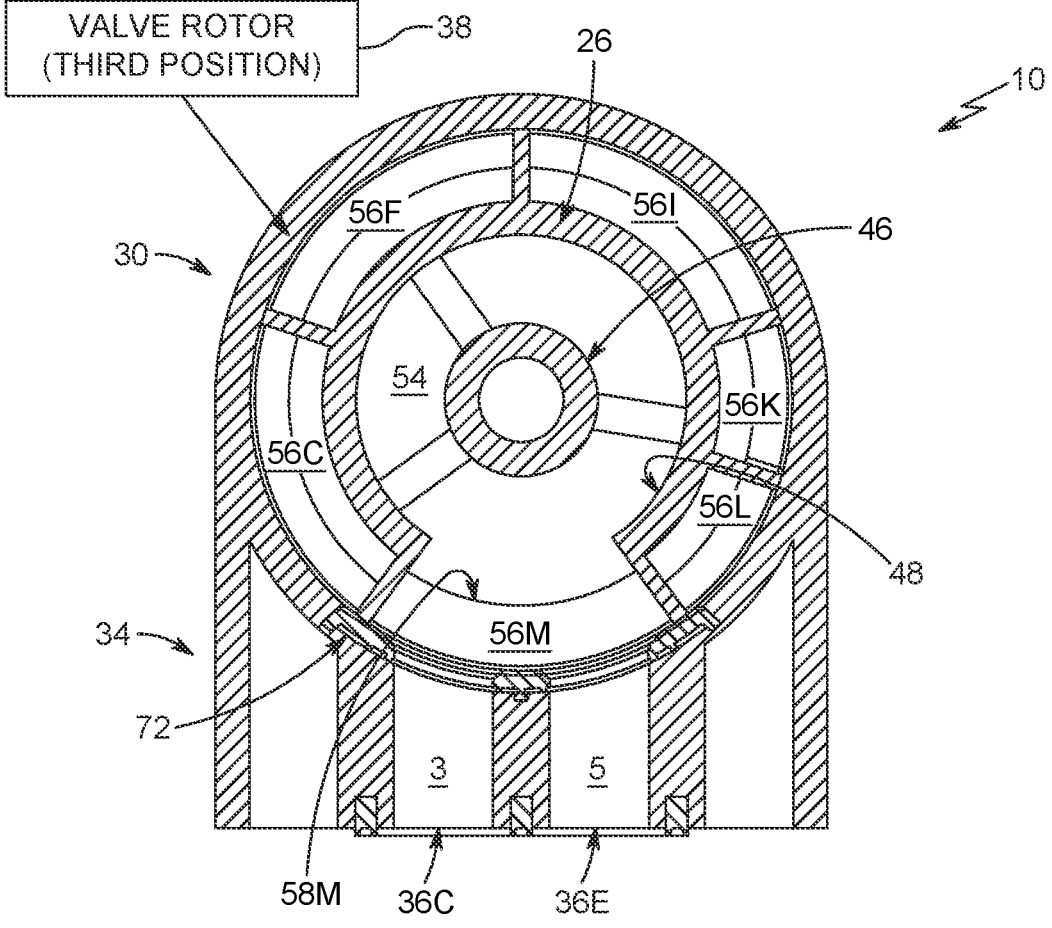
Figure 13B:
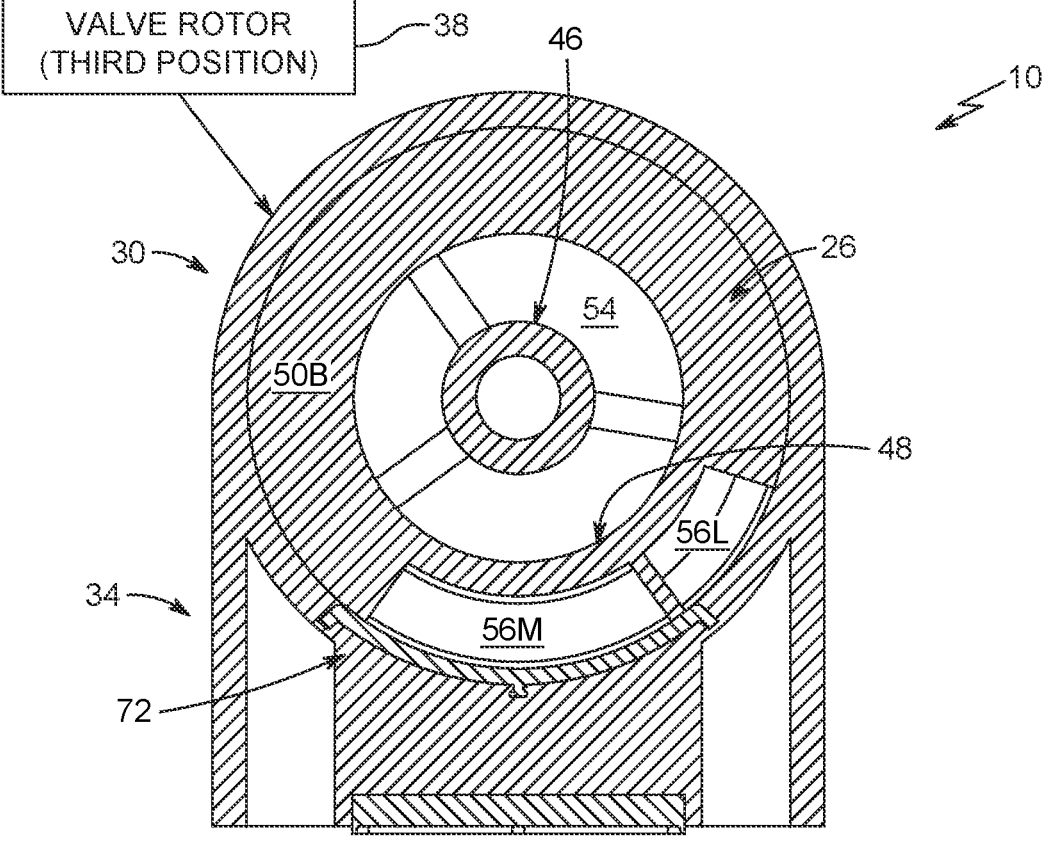
Figure 13C:
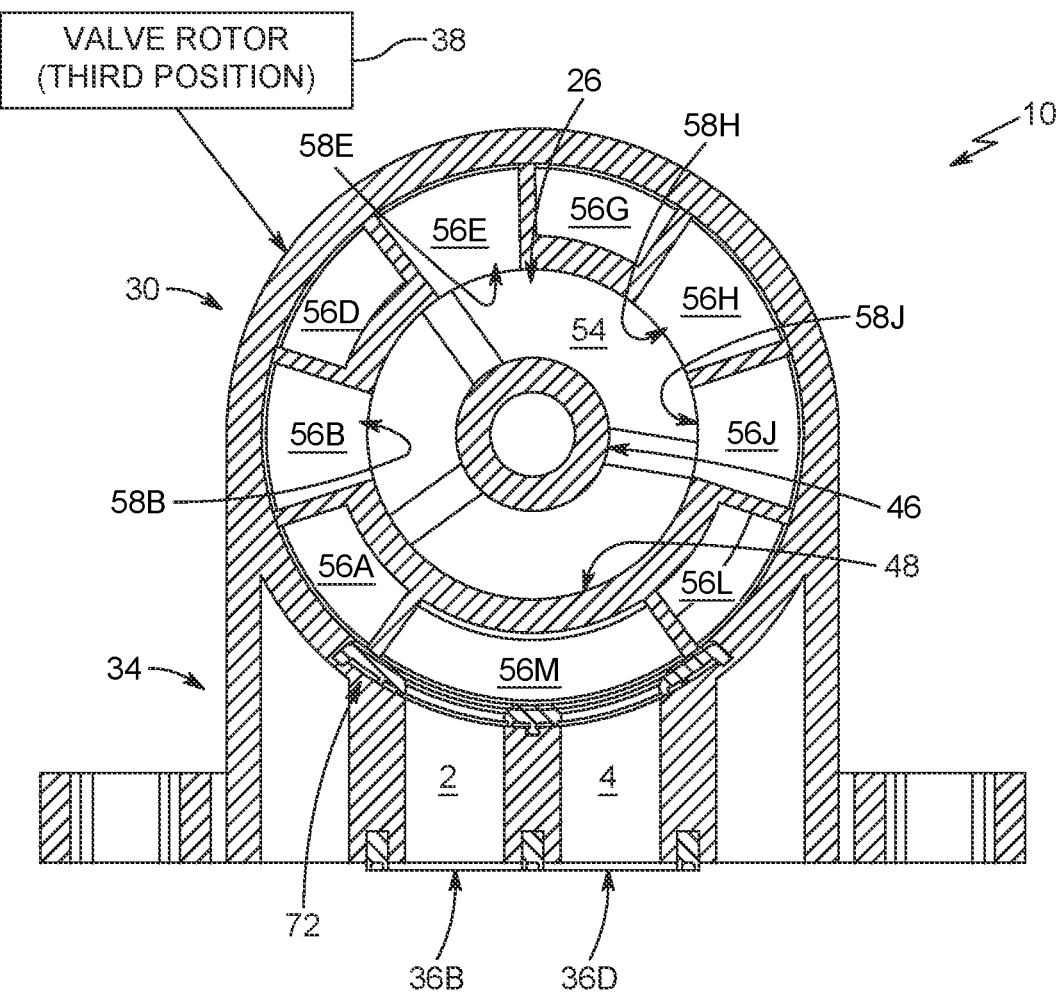
Figure 14:
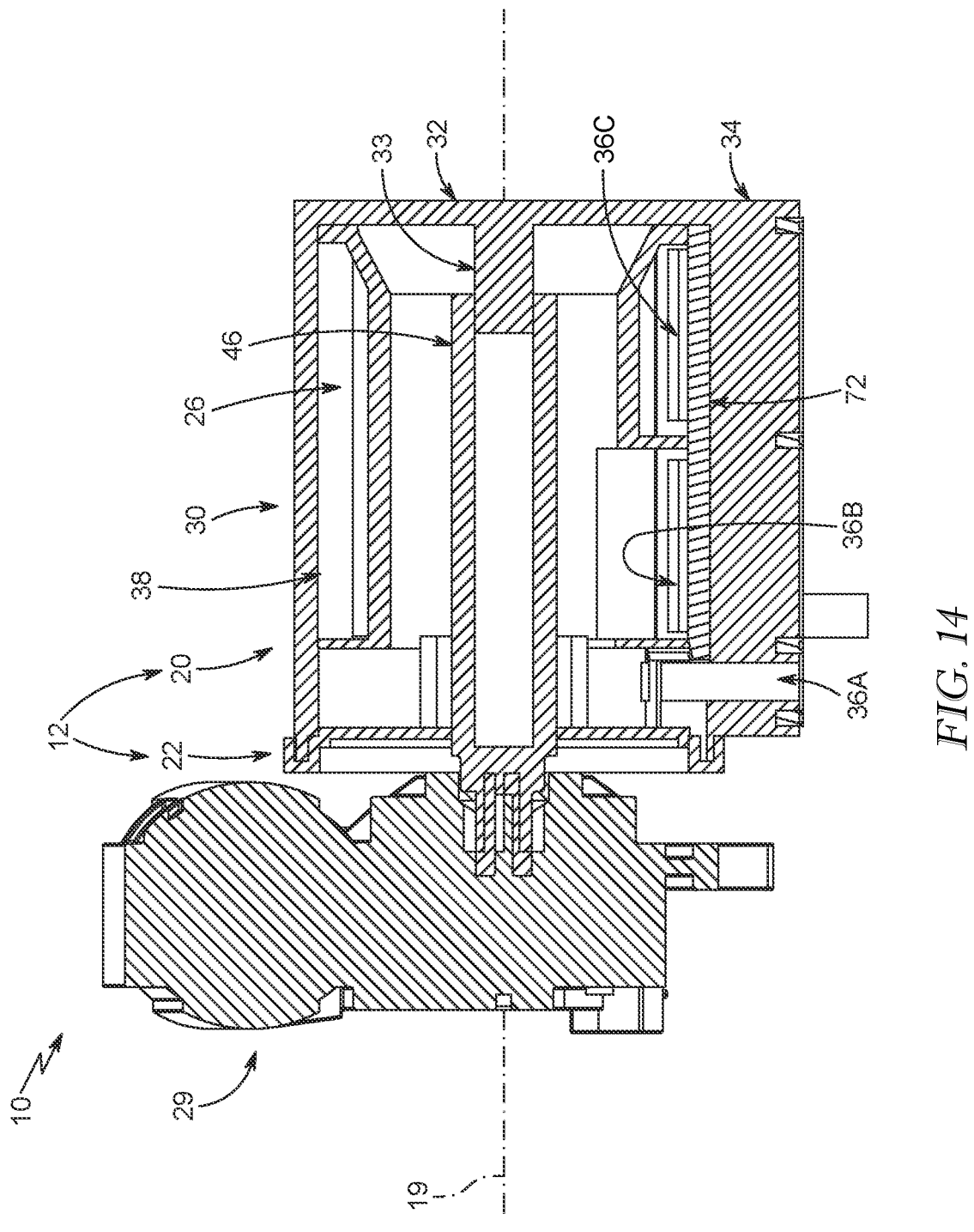
Figure 15A:
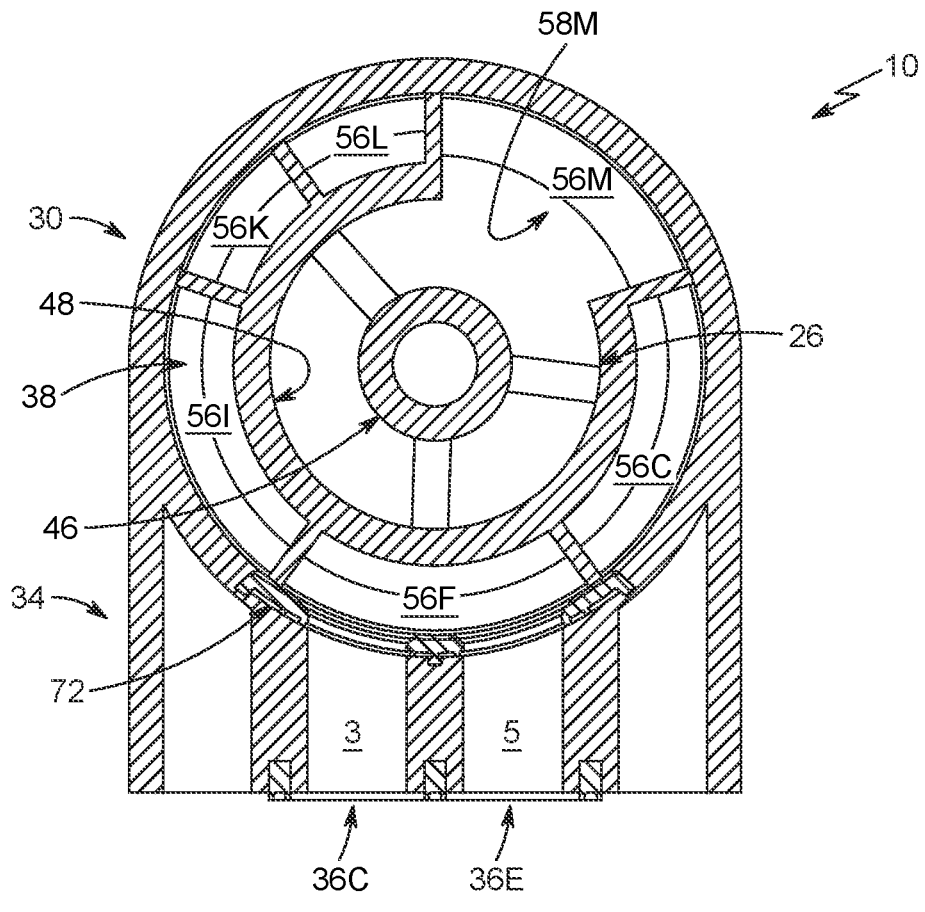
Figure 15B:
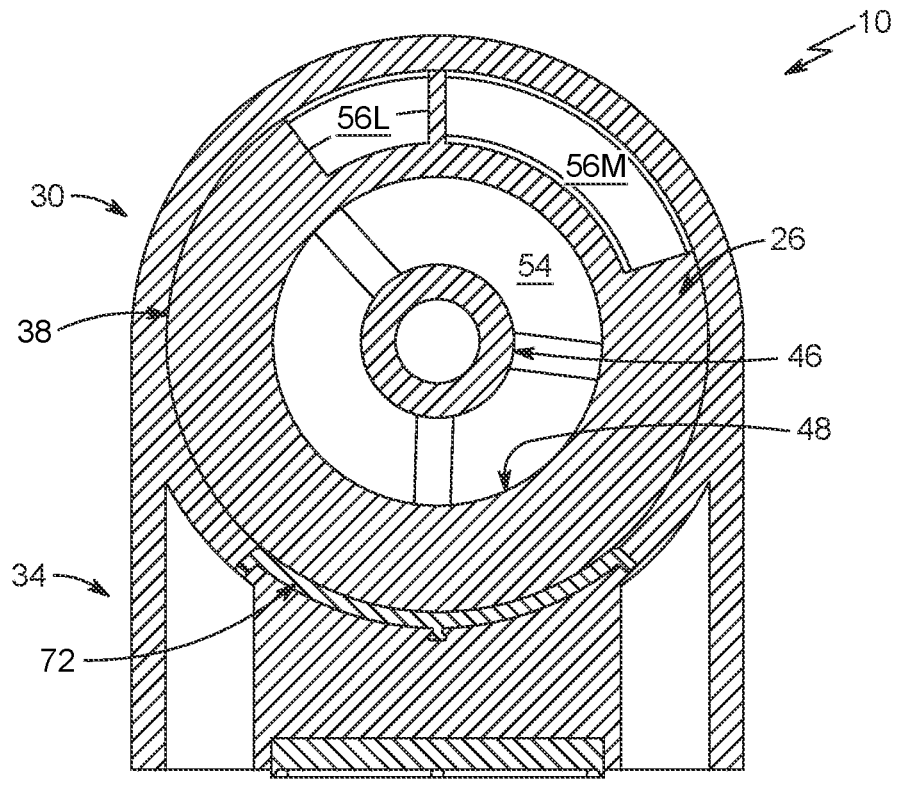
Figure 15C:
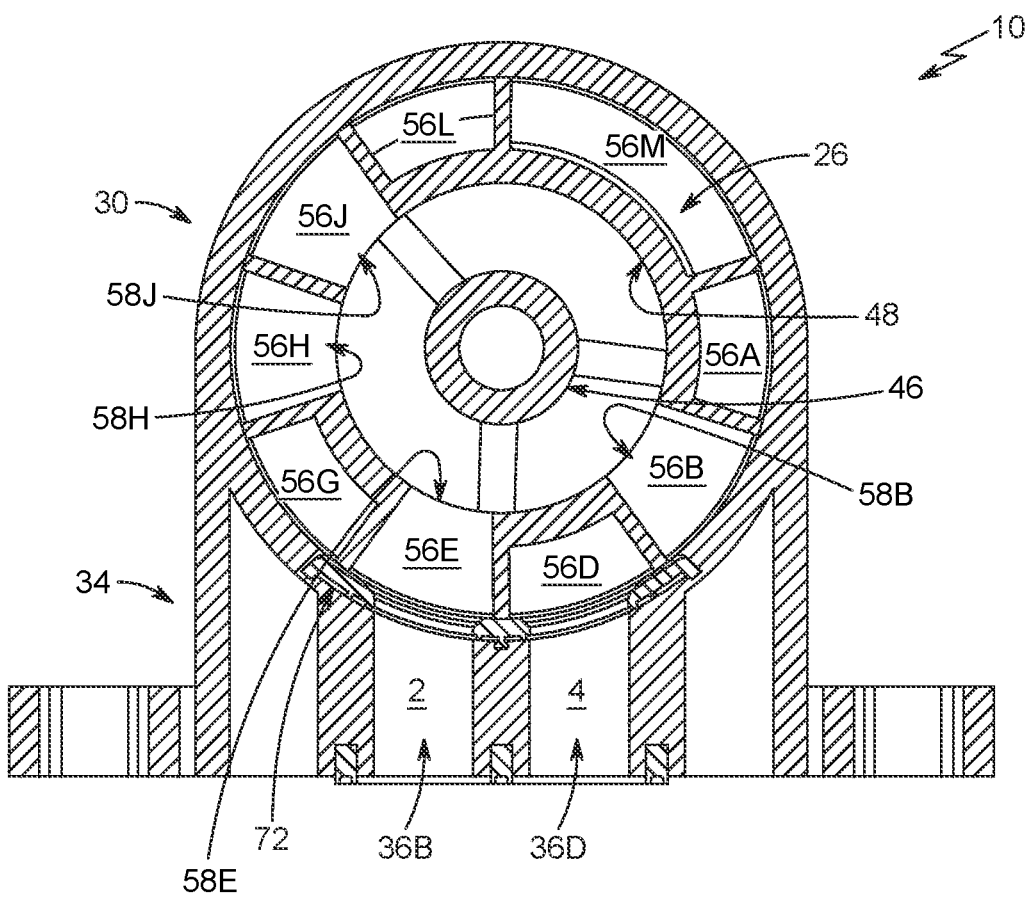
Figure 16:
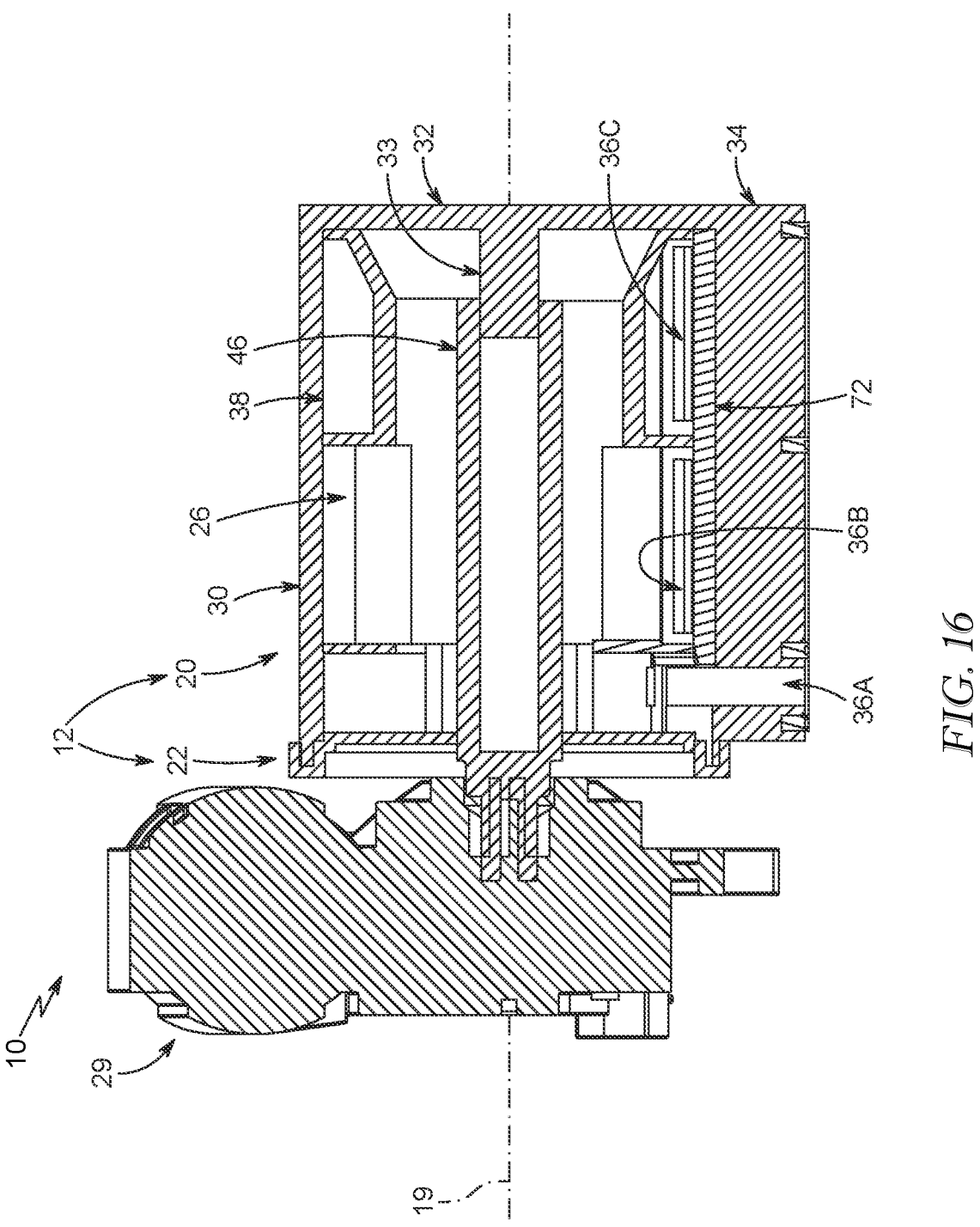
Figure 17A:
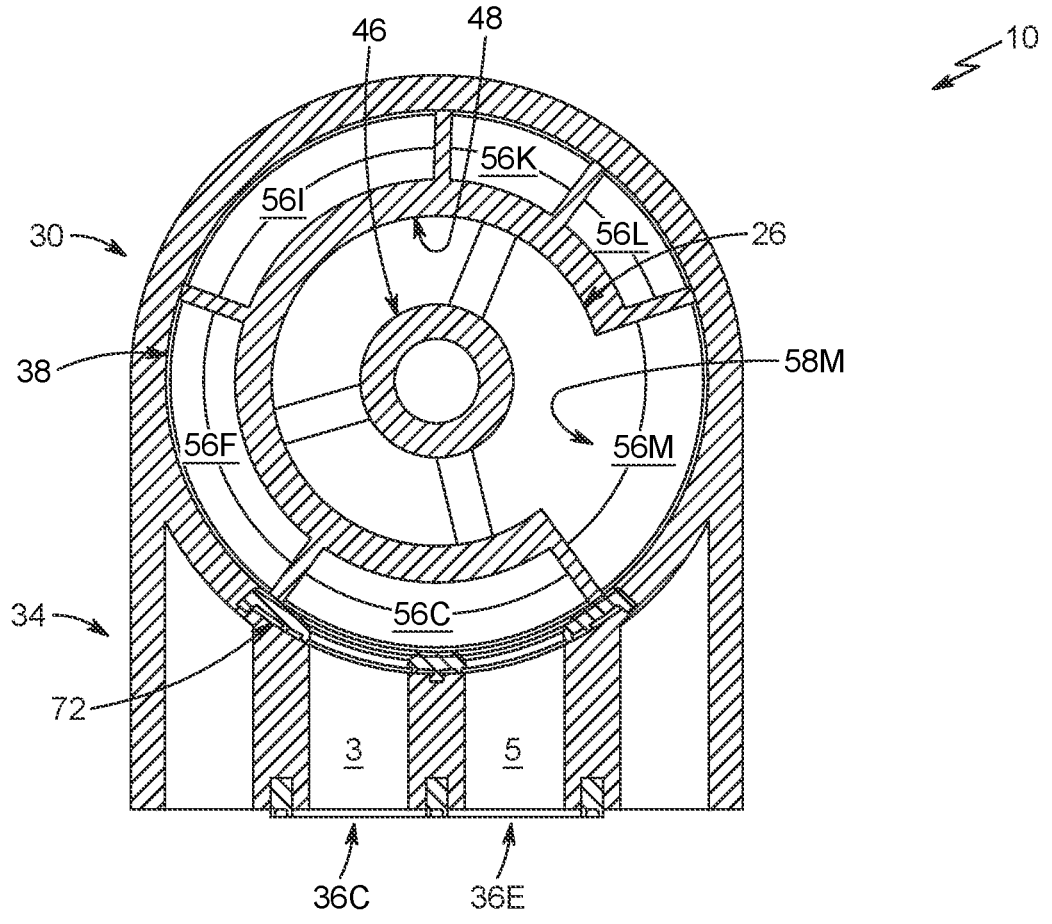
Figure 17B:
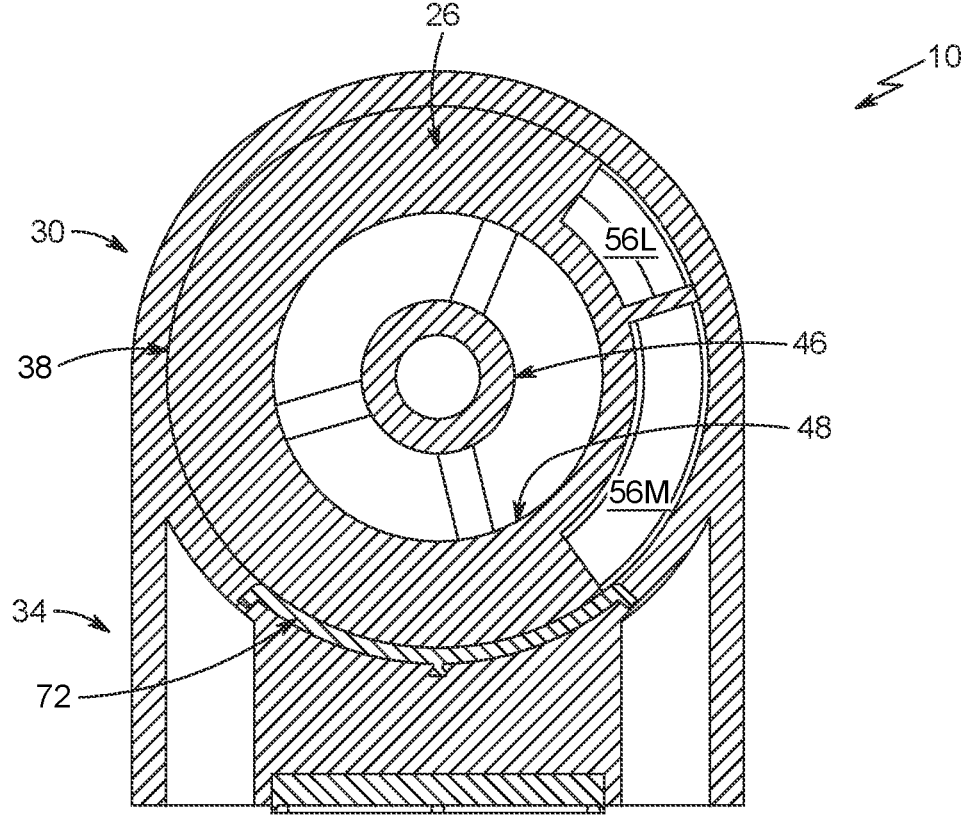
Figure 17C:
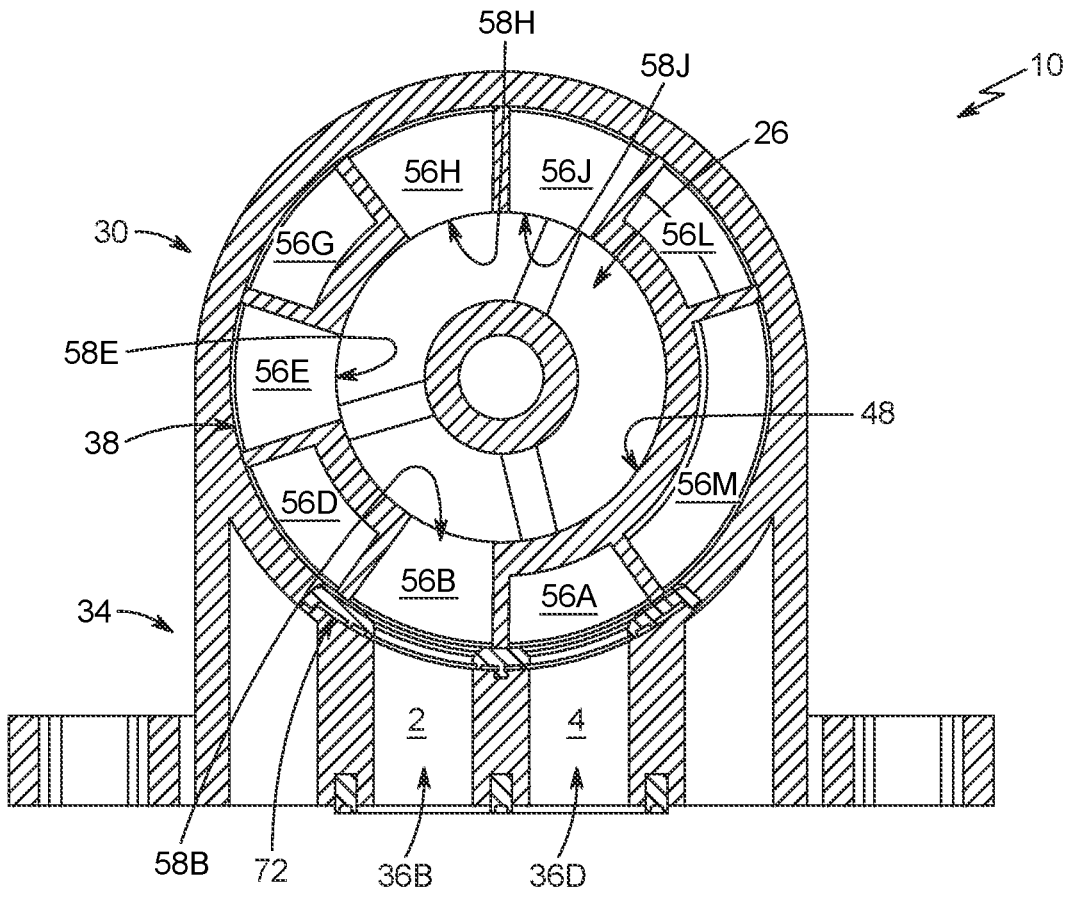
Figure 18A:
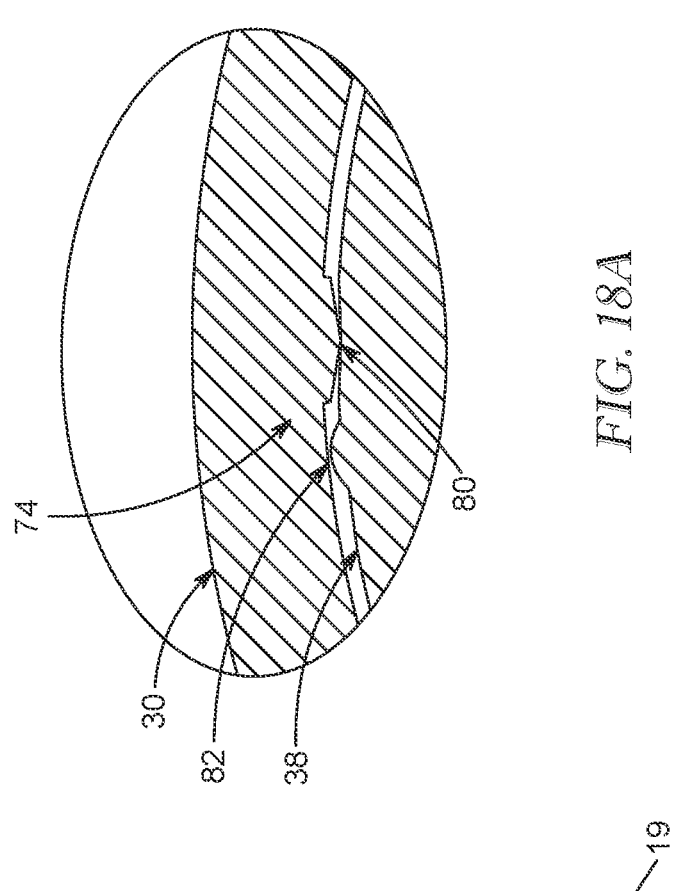
Figure 18:
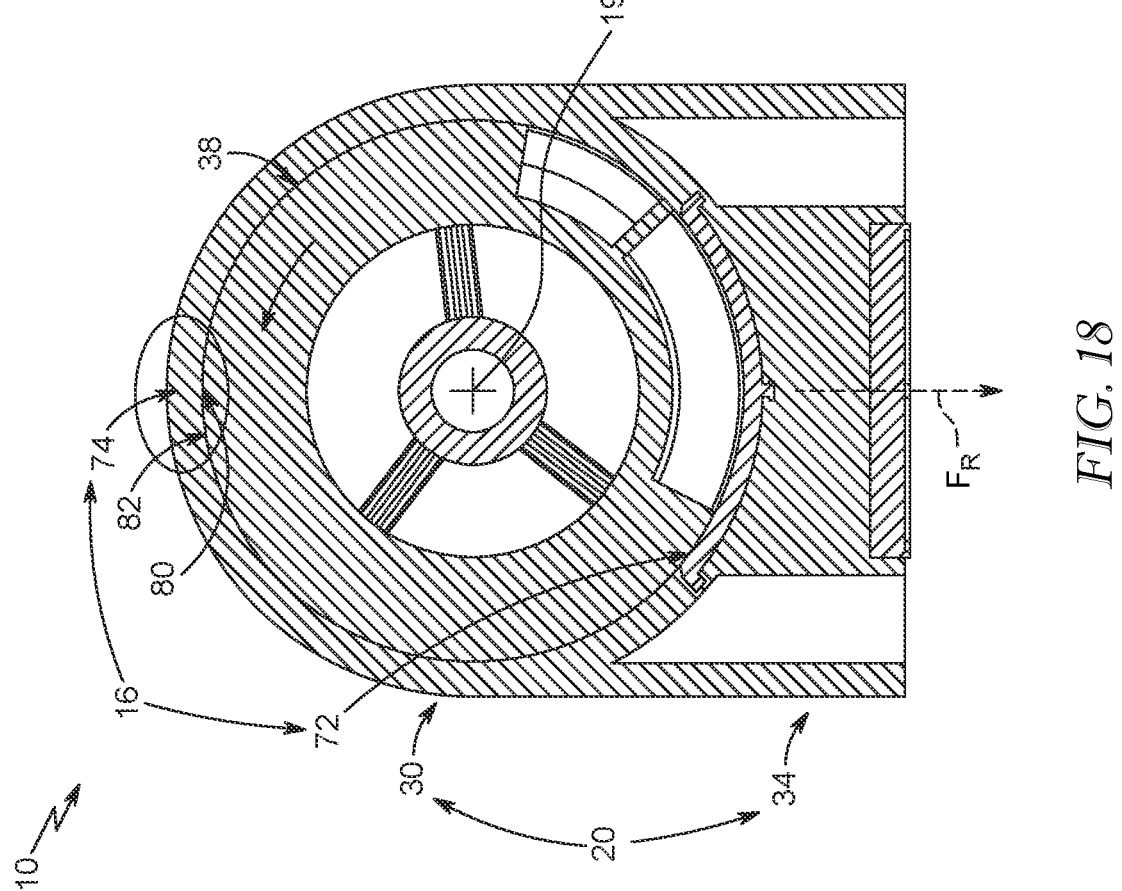
Figure 19A:
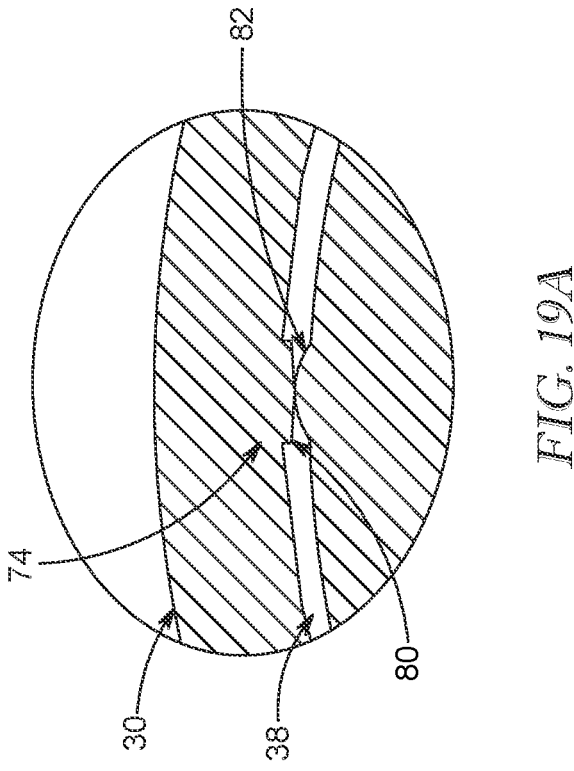
Figure 19:
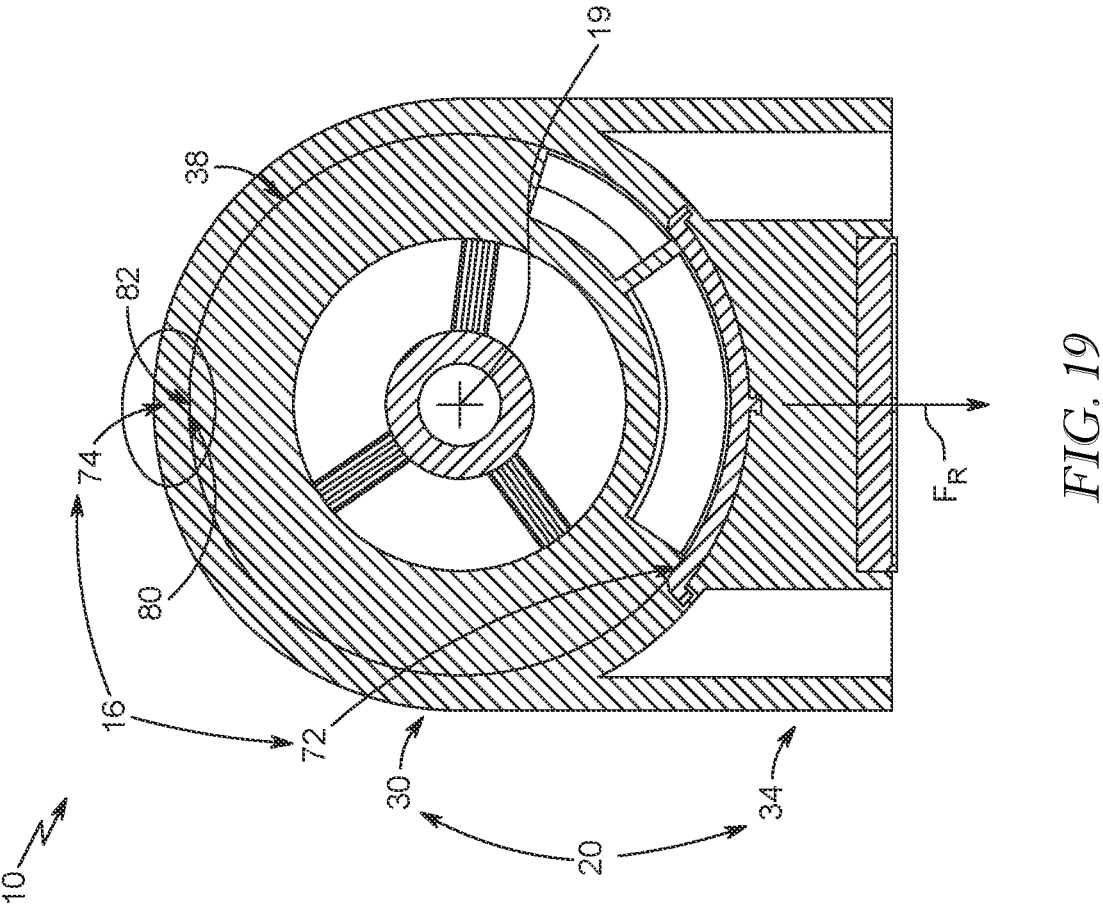

FIG. 8 is a cross-sectional view of the multi-way valve of FIG. 7A showing the valve rotor in the VALVE ROTOR FIRST position in which one of the chambers surrounds the third aperture and the fifth aperture to connect the third and fifth apertures in fluid communication as shown in FIG. 9A, while another one of the chambers surrounds the fourth aperture to block off the fourth aperture as shown in FIG. 9C;

FIG. 9A is a cross-sectional view of the multi-way valve of FIG. 8 taken at a first axial location along the valve axis showing the valve rotor in the VALVE ROTOR FIRST position in which one of the chambers defined by the valve rotor surrounds the third aperture and the fifth aperture to connect the third and fifth apertures in fluid communication with each other while isolating the third and fifth apertures from the other apertures;

FIG. 9B is a cross-sectional view of the multi-way valve of FIG. 8 taken at a second axial location along the valve axis showing the valve rotor in the VALVE ROTOR FIRST position in which one of the circumferential flow divider walls blocks flow from the third and fifth apertures to the first, second, and fourth apertures;

FIG. 9C is a cross-sectional view of the multi-way valve of FIG. 8 taken at a third axial location along the valve axis showing the valve rotor in the VALVE ROTOR FIRST position in which one of the chambers surrounds the fourth aperture to block off the fourth aperture and the chamber surrounding the second aperture has an opening so that the second aperture in fluid communication with the first aperture;

FIG. 10 is a cross-sectional view of the multi-way valve of FIG. 7B showing the valve rotor in the VALVE ROTOR SECOND position in which the valve rotor has rotated so that the valve rotor connects the second aperture and the third aperture, connects the first aperture and the fourth aperture, and blocks the fifth aperture to form another flow path, and further showing one of the chambers surrounds the second and third apertures to connect the second and third apertures in fluid communication as shown in FIGS. 11A-11C, while another one of the chambers surrounds the fifth aperture to block off the fifth aperture as shown in FIG. 11C;

FIG. 11A is a cross-sectional view of the multi-way valve of FIG. 10 taken at the first axial location along the valve axis showing the valve rotor in the VALVE ROTOR SECOND position in which the third and fifth apertures are surrounded by different chambers so that one of the axial flow divider walls blocks the flow of fluid therebetween while also blocking off the fifth aperture;

FIG. 11B is a cross-sectional view of the multi-way valve of FIG. 10 taken at the second axial location along the valve axis showing the valve rotor in the VALVE ROTOR SECOND position in which the chamber surrounding the third aperture extends axially so that the second and third apertures are connected in fluid communication;

FIG. 11C is a cross-sectional view of the multi-way valve of FIG. 10 taken at the third axial location along the valve axis showing the valve rotor in the VALVE ROTOR SECOND position in which the same chamber surrounding the third aperture surrounds the second aperture and the chamber surrounding the fourth aperture has an opening so that the fourth aperture in fluid communication with the first aperture;

FIG. 12 is a cross-sectional view of the multi-way valve of FIG. 7C showing the valve rotor in the VALVE ROTOR THIRD position in which the valve rotor has rotated so that the valve rotor connects all the apertures in fluid communication, further showing the chamber that surrounds the second aperture, the third aperture, the fourth aperture, and the fifth aperture and has an opening so that the apertures are in fluid communication with the first aperture as shown in FIGS. 13A-13C;

FIG. 13A is a cross-sectional view of the multi-way valve of FIG. 12 taken at the first axial location along the valve axis showing the valve rotor in the VALVE ROTOR THIRD position in which the chamber that surrounds both the third and fifth apertures has an opening so that the apertures are in fluid communication with the first aperture;

FIG. 13B is a cross-sectional view of the multi-way valve of FIG. 12 taken at the second axial location along the valve axis showing the valve rotor in the VALVE ROTOR THIRD position;

FIG. 13C is a cross-sectional view of the multi-way valve of FIG. 12 taken at the third axial location along the valve axis showing the valve rotor in the VALVE ROTOR THIRD position;

FIG. 14 is a cross-sectional view of the multi-way valve in another possible position similar to the VALVE ROTOR FIRST position;

FIG. 15A is a cross-sectional view of the multi-way valve of FIG. 14 taken at the first axial location along the valve axis;

FIG. 15B is a cross-sectional view of the multi-way valve of FIG. 14 taken at the second axial location along the valve axis;

FIG. 15C is a cross-sectional view of the multi-way valve of FIG. 14 taken at the third axial location along the valve axis;

FIG. 16 is a cross-sectional view of the multi-way valve in another possible position similar to the VALVE ROTOR FIRST position;

FIG. 17A is a cross-sectional view of the multi-way valve of FIG. 16 taken at the first axial location along the valve axis;

FIG. 17B is a cross-sectional view of the multi-way valve of FIG. 16 taken at the second axial location along the valve axis;

FIG. 17C is a cross-sectional view of the multi-way valve of FIG. 16 taken at the third axial location along the valve axis;

FIG. 18 is a cross-sectional view of the multi-way valve of FIG. 1 showing the biasing assembly has not yet applied the radial force to the valve rotor;

FIG. 18A is a detail view of FIG. 18 showing one of the protrusions formed on the valve rotor is spaced apart from the ridge formed on the valve housing body so that the radial force is not applied to the valve rotor by the biasing assembly to reduce friction on the valve rotor;

FIG. 19 is a cross-sectional view similar to FIG. 18 showing the valve rotor has rotated about the valve axis to one of the predetermined positions to cause the biasing assembly to apply the radial force to the valve rotor to urge the valve rotor radially outward toward the valve housing body and into engagement with the seal to increase friction therebetween; and FIG. 19A is a detail view of FIG. 19 showing the protrusion on the valve rotor is aligned with the ridge formed on the valve housing body so that the radial force is applied to the valve rotor by the biasing assembly to increase friction on the valve rotor and improve sealing.

DETAILED DESCRIPTION

Figure 3:
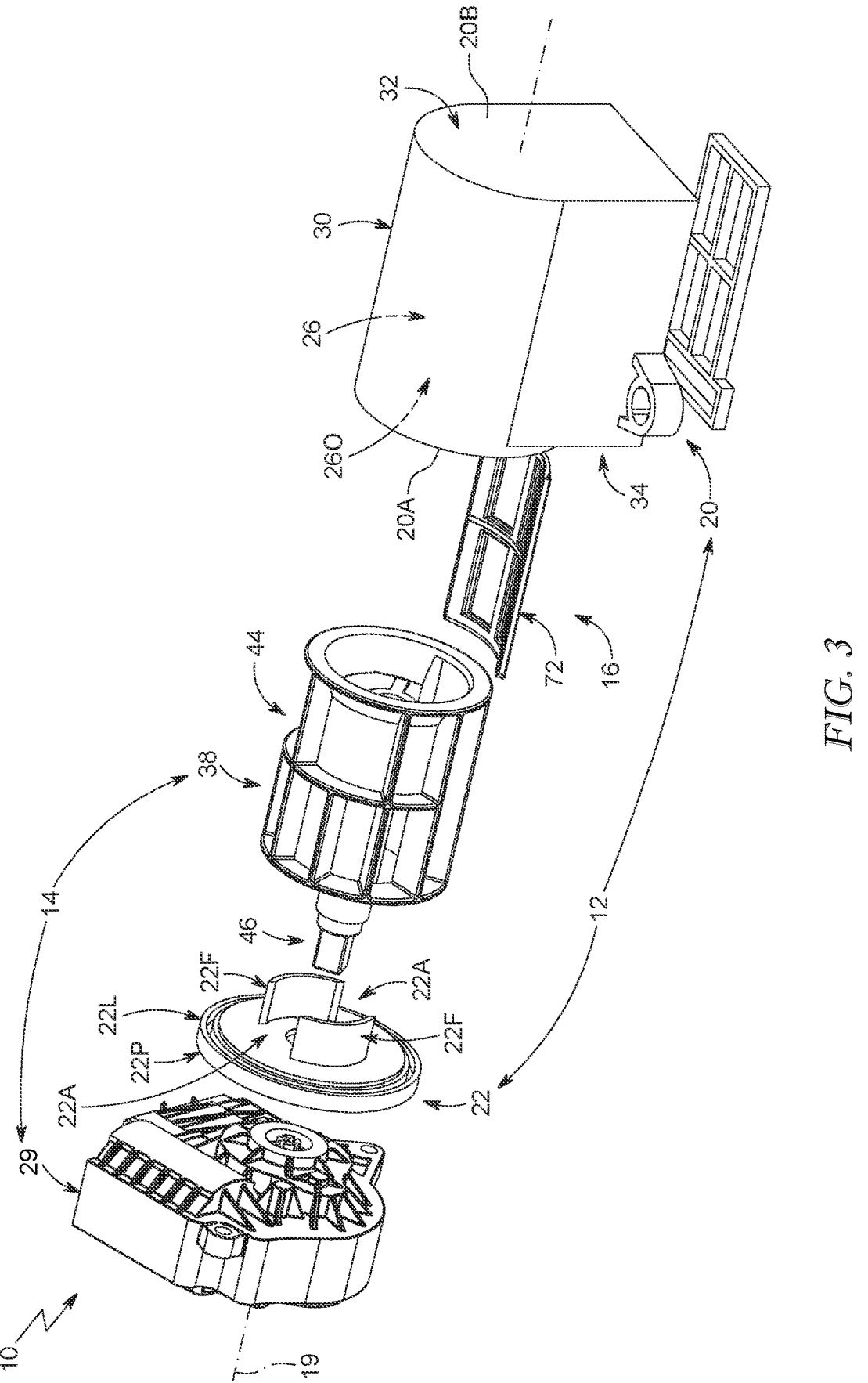

An illustrative multi-way valve 10 configured to control the flow of fluid to various thermal fluid circuits in a vehicle is shown in FIG. 1. The multi-way valve 10 includes a valve housing 12, a valve flow controller 14, and a sealing system 16 as shown in FIGS. 2 and 3. The valve flow controller 14 is arranged in the valve housing 12 to control flow through the valve housing 12. The sealing system 16 is configured to seal between the valve housing 12 and the valve flow controller 14.

The valve flow controller 14 includes a valve rotor 38 arranged in a valve cavity 26 formed by the valve housing 12 and an actuator 29 as shown in FIGS. 2 and 3. The valve rotor 38 is configured to rotate relative to the valve housing 12 about a valve axis 19. The actuator 29 is coupled to the valve rotor 38 to drive rotation of the valve rotor 38.

The valve rotor 38 cooperates with the valve housing 12 to define a plurality of flow paths through the valve housing 12 as shown in FIGS. 7A-7C. As the valve rotor 38 is rotated about the valve axis 19 to different set positions as shown in FIGS. 8-17C, the valve rotor 38 forms the different flow paths to control a flow of fluid through the valve housing 12 to different thermal fluid circuits.

The different modes of the multi-way valve 10 are shown in FIG. 7. The valve rotor 38 is in different predetermined positions in each of the different modes A-C to form the different flow paths through the valve housing 12. The multi-way valve 10 and/or the actuator 29 may include a control unit that is preprogrammed with the different modes A-D.

The arrangement and shape of the valve rotor 38 in the valve housing 12 reduces the overall size of the multi-way valve 10 compared to other multi-way valves and improves sealing between the valve rotor 38 and the valve housing 12. Other multi-way valves may have more complex passage-ways through the valve housing, which complicates sealing and increases the pressure drop as the fluid has to make more turns/changes direction more. The complex passageways may increase the potential for leaks across the different passageways. These valves may incorporate seals to seal between the passageways, but adding seals may require the actuator to have an increased torque capability to overcome the friction of the seals between the different components.

Moreover, adding more seals increases the overall manu-facturing cost of the multi-way valve. Some valves may use a Teflon® or polytetrafluoroethylene (PTFE) material for the seals. This may make manufacturing a multi-way valve expensive, especially as other valves have complex passage-ways with large, complex seals that may need large amounts of Teflon® or polytetrafluoroethylene (PTFE) material.

The multi-way valve 10 of the present disclosure includes a single valve rotor 38 that cooperates with the valve hosing 12 to form a plurality of flow paths. The arrangement of the valve rotor 38 reduces the amount of sealing material and improves sealing. Additionally, the arrangement of the valve rotor 38 reduces the contract surface area of the seal 72, thereby reducing the friction on the valve rotor 38.

Figure 4:
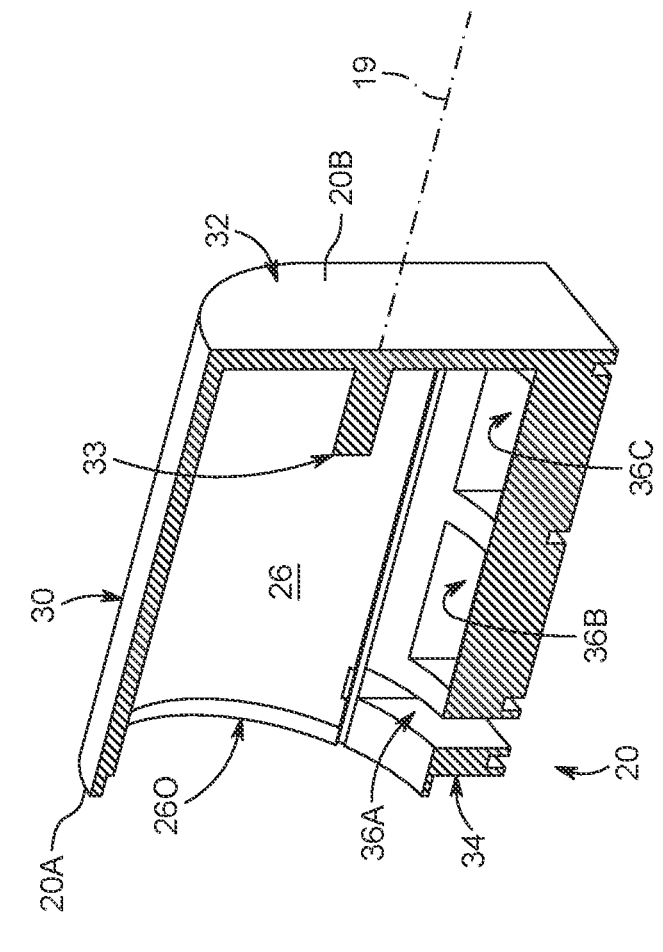
Figure 4:
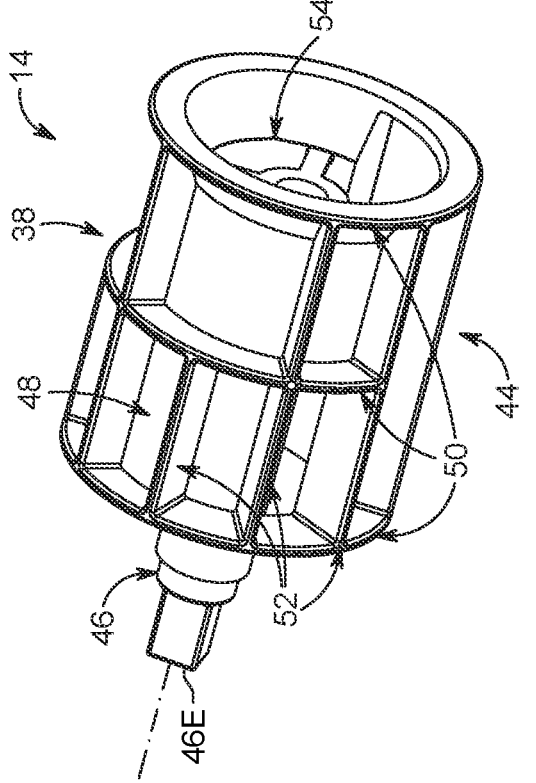

Turning again to the valve housing 12, the valve housing includes a valve housing body 20, a housing end cover 22 as shown in FIGS. 2-4. The valve housing body 20 is formed to include the valve cavity 26 and a plurality of apertures 36A-E that open into the valve cavity 26. The housing end cover 22 is coupled to a first end 20A of the valve housing body 20 to close a first end opening 260 to the valve cavity 26.

In some embodiments, the valve housing 12 may further include any one of a quick connect, push lock, barb, pipe, port, etc. that define the housing apertures 36A-E. In some embodiments, any outlet aperture may be defined by one of a quick connect, push lock, barb, pipe, port, etc.

The valve housing body 20 includes an annular outer wall 30, an end wall 32, and a housing base 34 as shown in FIGS. 2-4. The annular outer wall 30 extends around the valve axis 19 to define the valve cavity 26. The end wall 32 forms a second end 20B of the valve housing body 20 that is spaced apart axially from the first end 20A of the valve housing body 20 relative to the valve axis 19. The housing base 34 extends away from the outer wall 30 and is formed to define the plurality of apertures 36A-E that open in the valve cavity 26.

In the illustrative embodiment, the valve housing body 20 is also formed to include a rod 33 as shown in FIGS. 4, 8, 10, 12, 14, and 16. The rod 33 extends axially away from the end wall 32 into the valve cavity 26. The rod 33 is aligned with the valve axis 19. The rod 33 extends into the valve rotor 38 to provide support for one end of the valve rotor 38.

The plurality of housing apertures 36A-E includes a first aperture 36A, a second aperture 36B, a third aperture 36C, a fourth aperture 36D, and a fifth aperture 36E as shown in FIGS. 7A-17C. The first aperture 36A, the second aperture 36B, the third aperture 36C, the fourth aperture 36D, and the fifth aperture 36E open into the valve cavity 26.

In the illustrative embodiment, a seal 72 included in the sealing system 16 is located radially between the valve rotor 38 and the annular outer wall 30 of the valve housing body 20 as shown in FIGS. 8-17C. The seal 72 extends around the second aperture 36B, the third aperture 36C, the fourth aperture 36D, and the first aperture 36E.

In the illustrative embodiment, the seal 72 is a wrap-around type seal. In some embodiments, the seal 72 may be over molded. In some embodiments, the seals 72 may be an o-ring. In other embodiments, the seals 72 may be any other suitable seal.

The housing end cover 22 includes a cover plate 22P that extends circumferentially around the valve axis 19 and flanges 22F that each extend axially from the cover plate 22P, and a through hole 22H as shown in FIG. 3. The cover plate 22P couples to the first end 20A of the valve housing body 20. In the illustrative embodiment, an outer edge of the cover plate 22P forms a lip 22L that extends around the first end 20A of the valve housing body 20 to couple the housing end cover 22 to the valve housing body 20. Each flange 22F extends circumferentially at least partway around the valve axis 19 and extends axially away from the cover plate 22P into the valve cavity 26. The cover plate 22P is also formed to include a hole 22H that extends axially therethrough and receives a portion of the valve rotor 38.

Each flange 22F engages the valve rotor 38 as shown in FIG. 15. In the illustrative embodiment, the flanges 22F are spaced apart circumferentially from each other so as to form apertures 22A circumferentially therebetween.

The valve flow controller 14 includes the valve rotor 38. The valve rotor 38 is arranged in the valve cavity 26 of the valve housing body 20. The valve rotor 38 is configured to rotate relative to the valve housing body 20 about the valve axis 19.

The valve rotor 38 cooperates with the valve housing 12 to define a plurality of flow paths through the valve housing body 20. As the valve rotor 38 is rotated about the valve axis 19 to different set positions, the valve rotor 38 forms different flow paths to control the flow of fluid through the housing apertures 36A-E of the valve housing body 20.

Figures 5, 5A:
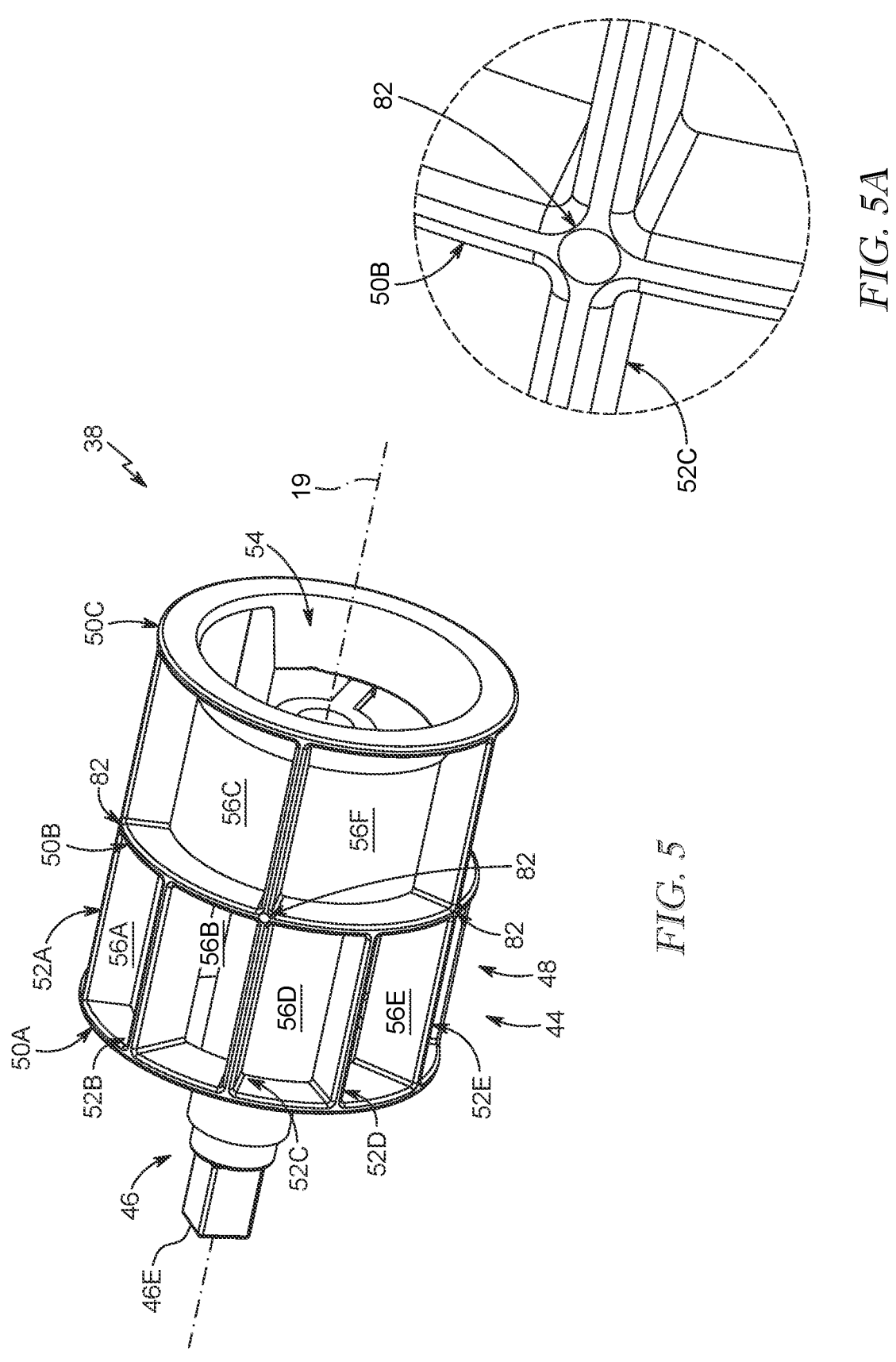
Figure 6A:
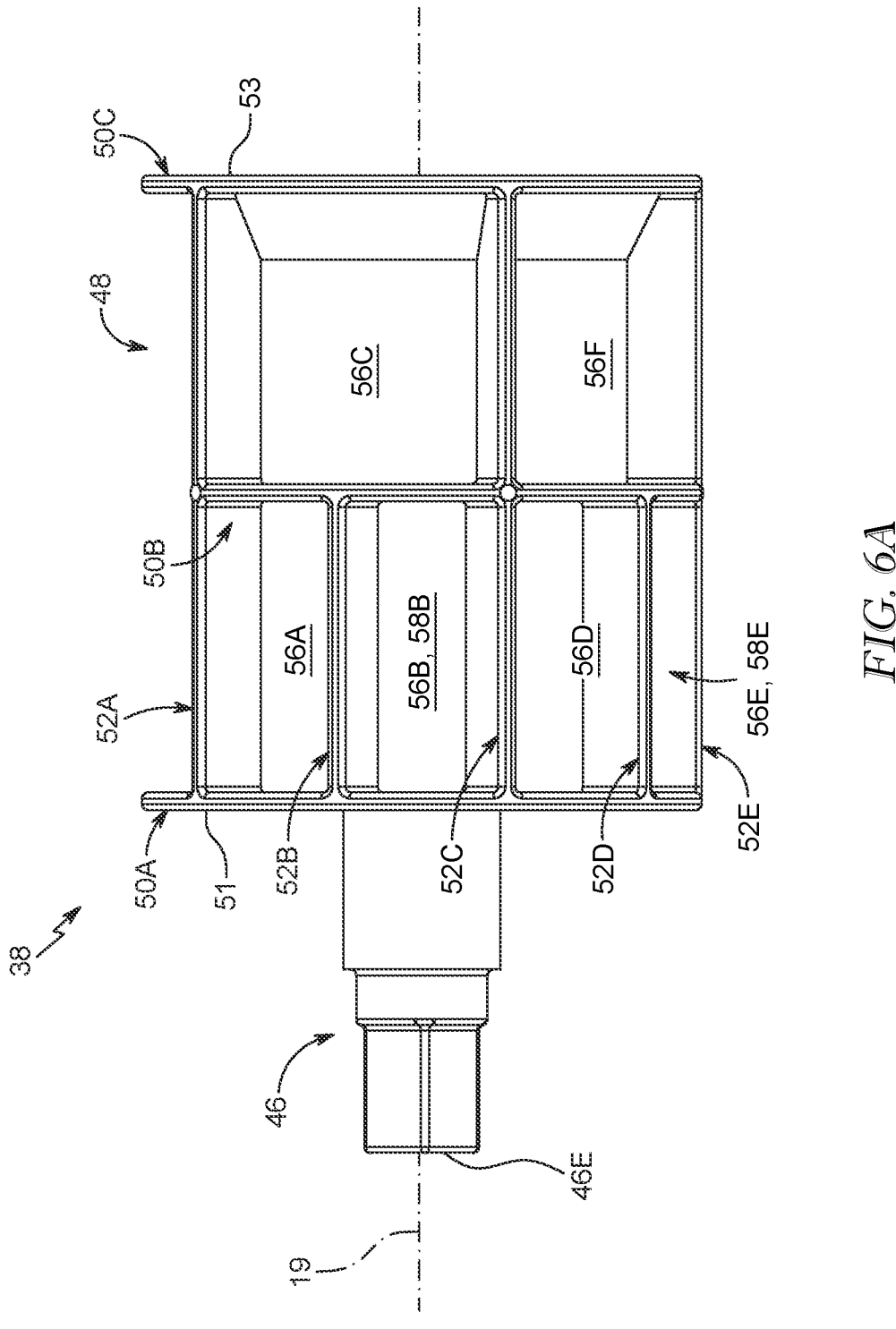
FIG. 6A is an elevation view of the valve rotor of FIG. 5 showing the different chambers defined by the different circumferential and axial flow divider walls that each extend radially outward away from the valve rotor drum.
Figure 6B:
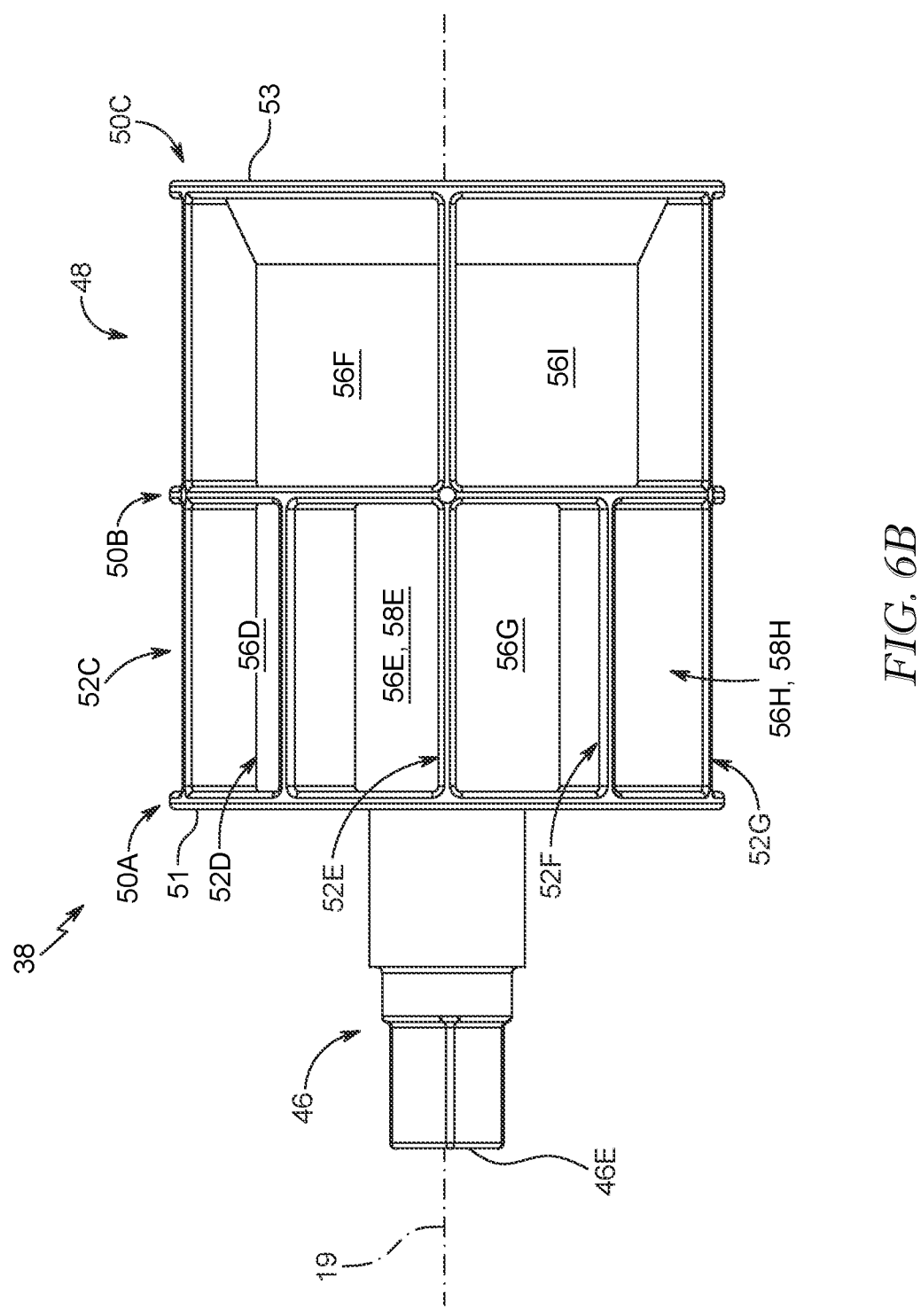
FIG. 6B is an elevation view of the valve rotor in FIG. 6A rotated 90 degrees about the valve axis compared to FIG. 6A to show different chambers defined by the different circumferential and axial flow divider walls that each extend radially outward away from the valve rotor drum.
Figure 6C:
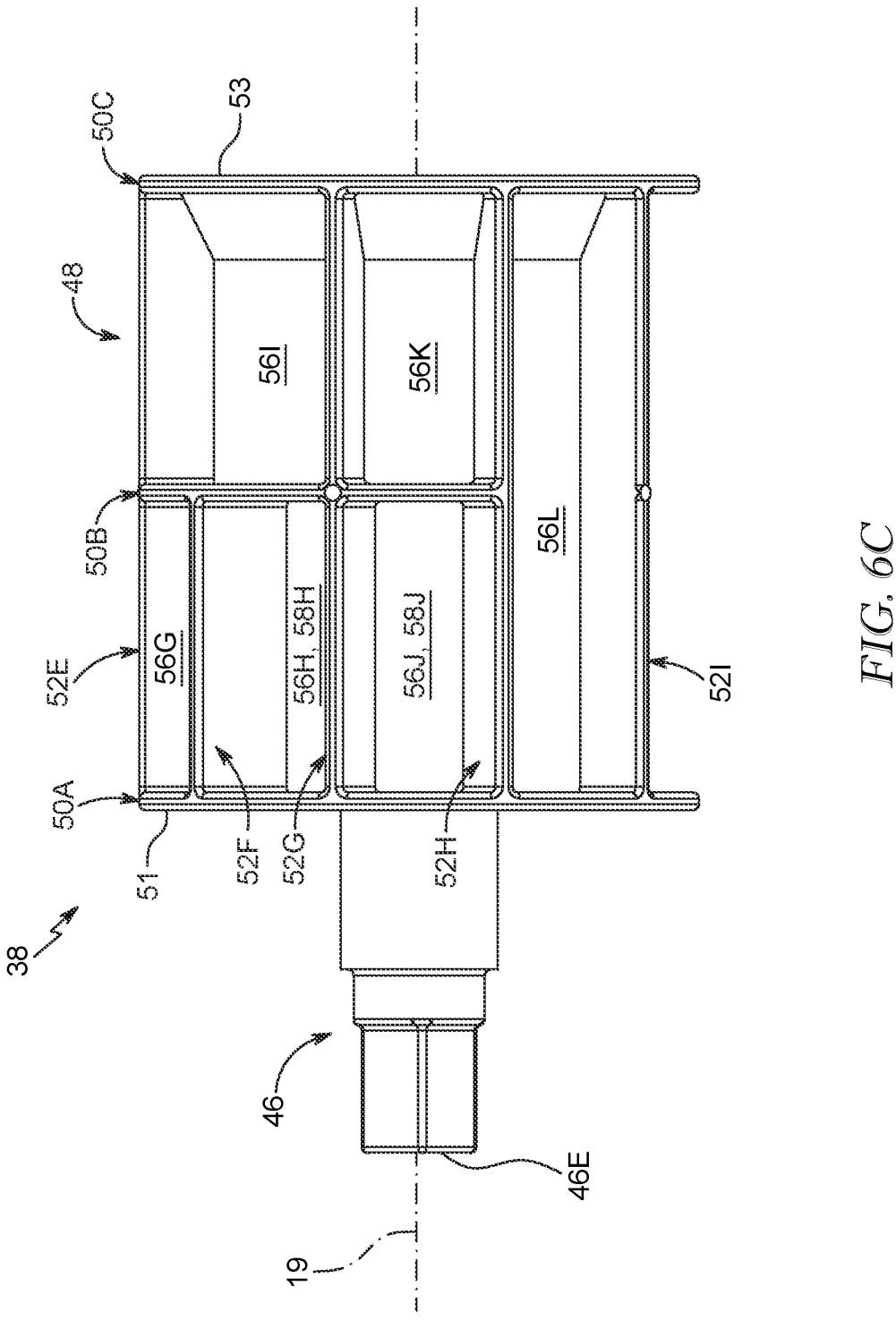
FIG. 6C is an elevation view of the valve rotor in FIG. 6B rotated 90 degrees about the valve axis compared to FIG. 6B to show different chambers defined by the different circumferential and axial flow divider walls that each extend radially outward away from the valve rotor drum.
Figure 6D:
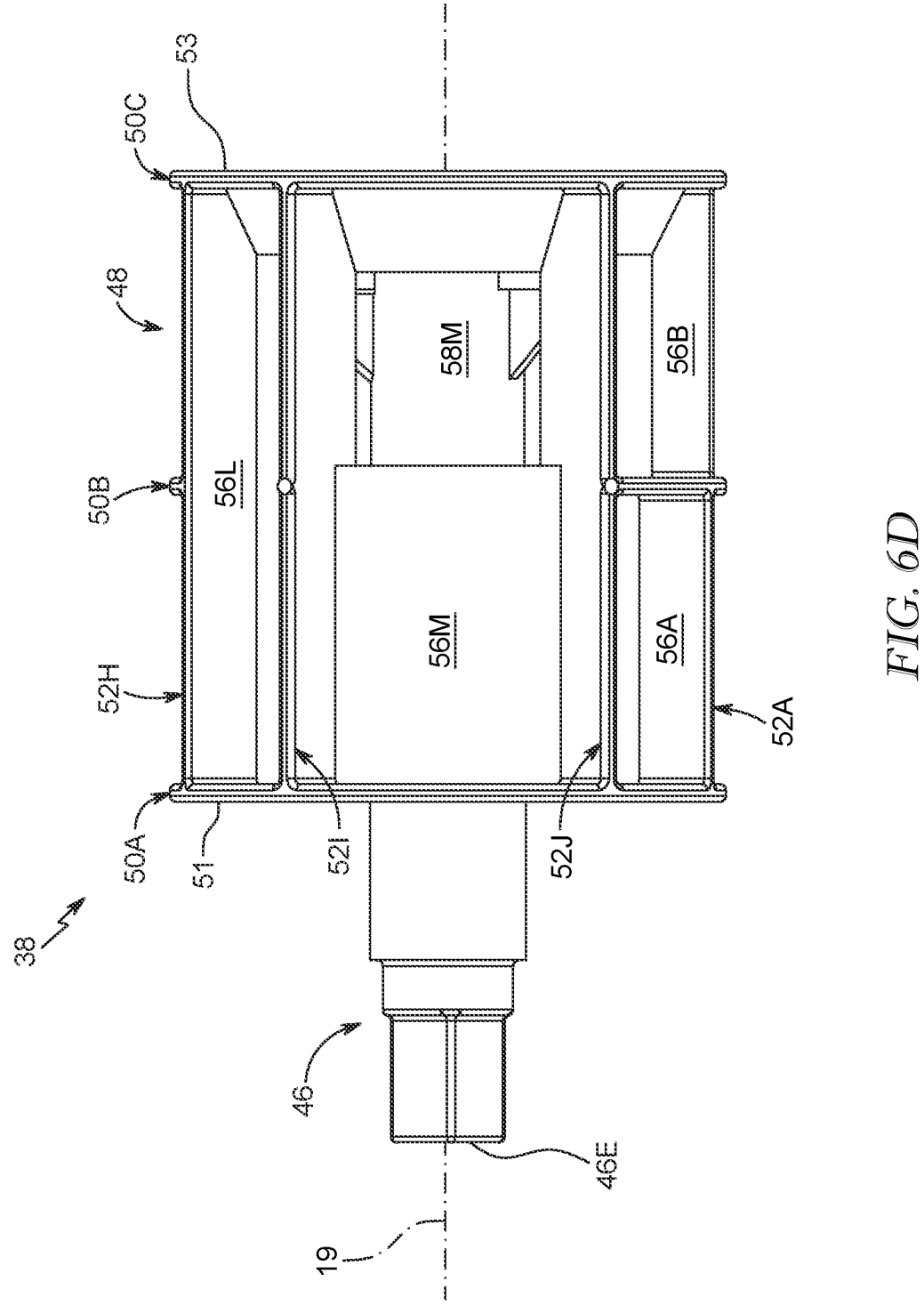
FIG. 6D is an elevation view of the valve rotor in FIG. 6C rotated 90 degrees about the valve axis compared to FIG. 6C to show different chambers defined by the different circumferential and axial flow divider walls that each extend radially outward away from the valve rotor drum.

The valve rotor 38 includes a valve rotor body 44 and a valve rotor shaft 46 that extends axially from the valve rotor body 44 as shown in FIGS. 5-6D. The valve rotor shaft 46 extends axially through the housing end cover 22 of the valve housing 12 to a terminal end 46E. The terminal end 46E is located outside of the housing end cover 22 in the illustrative embodiment to couple to the actuator 29.

The valve rotor shaft 46 is hollow in the illustrative embodiment as shown in FIGS. 8, 10, 12, 14, and 16. The rod 33 extends axially from the end wall 32 into the valve rotor shaft 46 to support the valve rotor 38 relative to the valve housing body 20.

The valve rotor body 44 includes a valve rotor drum 48, a plurality of circumferential flow divider walls 50A-C, and a plurality of axial flow dividers walls 52A-K as shown in FIGS. 6A-D. The valve rotor drum 48 extends circumferentially about the valve axis 19 and is hollow to define a rotor drum cavity 54. The plurality of circumferential flow divider walls 50A-C are spaced apart axially along the valve rotor drum 48. Each of the circumferential flow dividers walls 50A-C extend radially outward from and circumferentially at least partway around the valve rotor drum 48. The plurality of axial flow divider walls 52A-K are spaced apart circumferentially around the valve rotor drum 48. The plurality of axial flow divider walls 52A-K extend axially between the plurality of circumferential flow divider walls 50 to define a plurality of chambers 56.

In the illustrative embodiment, the valve rotor shaft 46 extends axially from the valve rotor body 44 through the rotor drum cavity 54 as shown in FIGS. 8, 10, 12, 14, and 16. The valve rotor body 44 includes a plurality of supports 45 that extend radially inward from the valve rotor drum to the valve rotor shaft 46 to support the valve rotor shaft 46.

The plurality of circumferential flow divider walls 50A-C includes a first circumferential flow divider wall 50A, a second circumferential flow divider wall 50B, and a third circumferential flow divider wall 50C as shown in FIGS. 6A-6D. The first circumferential flow divider wall 50A extends radially outward from and circumferentially all the way around the valve rotor drum 48 at a first axial end 51 of the valve rotor drum 48. The second circumferential flow divider wall 50B extends radially outward from and circumferentially all the way around the valve rotor drum 48 at a second axial end 53 of the valve rotor drum 48. The third circumferential flow divider wall 50C extends radially outward from and circumferentially only partway around the valve rotor drum 48 axially between the first and second circumferential flow divider walls 50A, 50B.

The plurality of axial flow divider walls 52A-K includes at least ten different axial flow divider walls 52A-K spaced apart circumferentially around the valve rotor drum 48 as shown in FIGS. 6A-D. Most of the plurality of axial flow divider walls 52A-K extend axially between the first and second axial ends 51, 53 of the valve rotor drum 48 and interconnect the first and second circumferential flow divider walls 50A, 50B. Other axial flow divider walls 52D, 52F, 52H only extend axially partway along the valve rotor drum 48 between the first and third circumferential flow divider walls 50A, 50C.

The different chambers 56A-M are defined between the different circumferential flow divider walls 50A-C and axial flow divider walls 52A-K as shown in FIGS. 6A-D. The plurality of chambers 56A-M includes at least thirteen different chambers 56A-M that range in size.

In the illustrative embodiment, the valve rotor drum 48 is formed to include openings 58B, 58E, 58H, 58J, 58M as shown in FIGS. 6A-D. The openings 58B, 58E, 58H, 58J, 58M extend through the valve rotor drum 48 and open into the rotor drum cavity 54. Each of the openings 58B, 58E, 58H, 58J, 58M corresponds to one of the chambers 56B, 56E, 56H, 56J, 56M. Each of the chambers 56B, 56E, 56H, 56J, 56M is in fluid communication with the rotor drum cavity 54 through the openings 58B, 58E, 58H, 58J, 58M.

As the valve rotor 38 rotates, the valve rotor body 44 controls the flow to each aperture 36A, 36B, 36C, 36D, 36E formed in the valve housing body 20 as shown in FIGS. 15-17C. The valve rotor body 44 controls the flow to each aperture 36A, 36B, 36C, 36D, 36E by aligning different chambers 56A-M with the different apertures 36A, 36B, 36C, 36D, 36E in the different predetermined positions. This controls which apertures 36A, 36B, 36C, 36D, 36E are in fluid communication with the rotor drum cavity 54 or with one of the other apertures 36A, 36B, 36C, 36D, 36E.

The first aperture 36A is always in fluid communication with the rotor drum cavity 54 in the illustrative embodiment. The fluid flows to/from the first aperture 36A through the apertures 22A formed in the housing end cover 22 and into the rotor drum cavity 54.

In some positions, portions of the valve rotor body 44 surrounds one of the other apertures 36B, 36C, 36D, 36E formed in the valve housing body 20 to block the flow of fluid therethrough. Some of the chambers 56A-M are sized to cover only the one aperture 36B, 36C, 36D, 36E in certain predetermined positions so that the flow of fluid is blocked from flowing into/out of the rotor drum cavity 54 or is blocked from flowing between apertures 36B, 36C, 36D, 36E.

The different modes of the multi-way valve 10 are shown in FIG. 7. The first mode (mode A) and the second mode (mode B) are shown in FIG. 7A. The third mode (mode C) is shown in FIG. 7B. The fourth mode (mode D) is shown in FIG. 7C.

In modes A and B, the valve rotor 38 is in a VALVE ROTOR FIRST position as shown in FIGS. 8-9C. In the VALVE ROTOR FIRST position, the valve rotor 38 connects the first aperture 36A to the second aperture 36B, connects the third aperture 36C and the fifth aperture 36E, and blocks the fourth aperture 36D to form the first flow path. One of the chambers 561 surrounds the third aperture 36C and the fifth aperture 36E to connect the third and fifth apertures, 36C, 36E in fluid communication. Another one of the chambers 56G surrounds the fourth aperture 36D to block the flow of fluid to the fourth aperture 36D.

In mode C, the valve rotor 38 moves to a VALVE ROTOR SECOND position as shown in FIG. 10-11C. In the VALVE ROTOR SECOND position, the valve rotor 38 has rotated to connect the second aperture 36B and the third aperture 36C, to connect the first aperture 36A and the fourth aperture 36D, to block the fifth aperture 36E. One of the chambers 56L surrounds the second and third apertures 36B, 36C to connect the second and third apertures 36B, 36C in fluid communication. Another one of the chambers 56K surrounds the fifth aperture 36E to block the flow of fluid to the fifth aperture 36E.

In mode D, the valve rotor 38 moves to a VALVE ROTOR THIRD position as shown in FIGS. 12-13C. In the VALVE ROTOR THIRD position, the valve rotor 38 has rotated to connect all the apertures 36A-E. One of the chambers 56M surrounds the second aperture 36B, the third aperture 36C, the fourth aperture 36D, and the fifth aperture 36E and the chamber 56M has the opening 58M so that the apertures 36B-E are in fluid communication with the first aperture 36A.

The multi-way valve 10 and/or the actuator 29 may include the control unit configured to direct the actuator 29 to move the valve rotor 38 to the different predetermined positions in each of the different modes A-D. Based on where the vehicle needs fluid, the control unit would direct the actuator 29 to move the valve rotor 38 to one of the positions for the desired mode.

The sealing system 16 helps seal between the valve housing 12 and the valve rotor 38 in the different predetermined positions as shown in FIGS. 18-19A. The sealing system 16 seals between the valve housing body 20 and the valve rotor 38.

The sealing system 16 includes the seal 72 and a biasing assembly 74 as shown in FIGS. 18-19A. The seal 72 is located radially between the valve rotor 38 and the valve housing body 20. The seal 72 extends axially between the first and second ends 51, 53 of the valve rotor 38 and extends circumferentially partway about the valve axis 19. The biasing assembly 74 is configured to selectively apply a radial force FR on the valve rotor 38 to urge the valve rotor 38 toward the base 34 of the valve housing body 20 when the valve rotor 38 is in one of the plurality of different predetermined positions so as to increase sealing between the valve rotor 38 and the valve housing body 20. This radial force FR is applied to urge the valve rotor 38 into engagement with the seal 72 when the valve rotor 38 is in one of the plurality of different predetermined positions to improve sealing between the valve rotor 38 and the valve housing body 20.

The seal 72 surrounds each of the plurality of apertures 36B, 36C, 36D, 36E formed in the valve housing body 20. In the illustrative embodiment, the seal 72 includes holes that align with the apertures 36B, 36C, 36D, 36E in the valve housing body 20 as shown in FIGS. 15-17C.

The biasing assembly 74 selectively applies the radial force FR to increase friction between the valve rotor 38 and the seal 72 at the different predetermined positions, but removes the radial force FR when the valve rotor 38 rotates to reduce the friction between the valve rotor 38 and the seal 72. In this way, the torque needed to rotate the valve rotor 38 is reduced and the wear on the seal 72 is reduced.

In the illustrative embodiment, the seal 72 comprises a polytetrafluoroethylene material. In some embodiments, the seals may be made of another suitable material.

In other multi-way seals, large amounts of Teflon® or polytetrafluoroethylene (PTFE) material may be used to seal the different passages, which can make manufacturing the multi-way valve expensive. Therefore, by reducing the amount of friction on the seal 72 during rotation of the valve rotor 38, wear on the seal 72 is reduced. This reduces the need to replace the seal 72 as well and reduces the cost of repairing the multi-way valve 10. In other embodiments, the seals may be made of another suitable material.

Turning again to the sealing system 16, the biasing assembly 74 includes a ridge 80 and a plurality of protrusions 82 as shown in FIGS. 18-19A. The ridge 80 extends radially inward from and axially along the annular outer wall 30 of the valve housing body 20. The ridge 80 extends radially inward from the annular outer wall 30 opposite the apertures 36A-E. The plurality of protrusions 82 extend radially outward from the valve rotor 38 and are configured to engage the ridge 80 on the valve housing body 20 as the valve rotor 38 rotates about the valve axis 19 to the plurality of different predetermined positions.

In the illustrative embodiment, the protrusions 82 are located at the intersection of the third circumferential flow divider wall 50C and the different axial flow divider walls 52A-K. The protrusions 82 are spaced apart circumferentially around the valve rotor body 44. In the illustrative embodiment, the protrusions 82 are spaced apart at about 72 degree intervals around the valve rotor 38.

The ridge 80 is fixed to the valve housing body 20. Each of the protrusions 82 on the valve rotor 38 rides against the ridge 80 as the valve rotor 38 is rotated and applies downward radial force FR to the valve rotor 38 when aligned with the ridge 80 on the valve housing body 20. This radial force FR generates a contact pressure between the valve rotor 38 and the elastomer seal 72. The increased contact pressure and resulting increase in friction are only generated when the ridge 80 is aligned with one of the protrusions 82 on the valve rotor 38. This reduces friction and torque on the actuator 29 during movement between seal points.

In some embodiments, the ridge 80 and the protrusions 82 may be interchangeable. The ridge 80 and the protrusions 82 may be interchangeable such that the ridge 80 is formed on the valve rotor 38 and the protrusion 82 is formed on the valve housing body 20.

The invention claimed is:

1. A multi-way valve comprising a valve housing including a valve housing body and a housing end cover coupled to a first end of the valve housing body, the valve housing body shaped to define a valve cavity and a plurality of apertures that extend radially through the valve housing body and open into the valve cavity, and the housing end cover coupled to the first end of the valve housing to close an end opening to the valve cavity, and a valve flow controller includes a valve rotor arranged in the valve cavity of the valve housing body and configured to rotate relative to the valve housing body about a valve axis and an actuator coupled to the valve rotor to drive rotation of the valve rotor about the valve axis, wherein the valve rotor cooperates with the valve housing to define a plurality of flow paths when the valve rotor is rotated about the valve axis to a plurality of different predetermined positions to control a flow of fluid through the valve housing, wherein the valve housing body includes an annular outer wall that extends around the valve axis to define the valve cavity, a housing base that extends from the annular outer wall and formed to define the plurality of apertures that extend radially through the housing base relative to the valve axis, and an end wall opposite the housing end cover and a rod that extends axially away from the end wall into the valve cavity into the valve rotor to provide support for one end of the valve rotor, wherein the valve rotor includes a valve rotor body and a valve rotor shaft that extends axially from the valve rotor body through the housing end cover of the valve housing to a terminal end located outside of the housing end cover of the valve housing and coupled to the actuator, and wherein the valve rotor body of the valve rotor includes a valve rotor drum that extends circumferentially about the valve axis, a plurality of circumferential flow divider walls spaced apart axially along the valve rotor drum that extend radially outward from and circumferentially at least partway around the valve rotor drum, and a plurality of axial flow divider walls that extend axially between the plurality of circumferential flow divider walls to define a plurality of chambers therebetween.

2. The multi-way valve of claim 1, further comprising a sealing system configured to seal between the valve rotor and the valve housing body, the sealing system including a seal located radially between the valve rotor and the valve housing body that surrounds each of the plurality of apertures formed in the valve housing body.

3. The multi-way valve of claim 2, wherein the sealing system further includes biasing means for applying a radial force on the valve rotor to urge the valve rotor into engagement with the seal when the valve rotor is in one of the plurality of different predetermined positions to improve sealing between the valve rotor and the valve housing body and for removing the radial force on the valve rotor to reduce friction between the valve rotor and the seal when the valve rotor is rotated about the valve axis from one position to another position included in the plurality of different predetermined positions.

4. The multi-way valve of claim 3, wherein the biasing means includes a ridge that extends radially inward from and axially along the annular outer wall of the valve housing and a plurality of protrusions that extend radially outward from the valve rotor and configured to engage the ridge on the valve housing body as the valve rotor rotates about the valve axis to the plurality of different predetermined positions.

5. The multi-way valve of claim 2, wherein the seal comprises polytetrafluoroethylene material.

6. The multi-way valve of claim 2, the sealing system further comprising a biasing assembly configured to selectively apply a radial force on the valve rotor to urge the valve rotor into engagement with the seal when the valve rotor is in one of the plurality of different predetermined positions to improve sealing between the valve rotor and the valve housing body.

7. The multi-way valve of claim 6, wherein the biasing assembly includes a ridge that extends radially inward from and axially along the annular outer wall of the valve housing and a plurality of protrusions that extend radially outward from the valve rotor and configured to engage the ridge on the valve housing body as the valve rotor rotates about the valve axis to the plurality of different predetermined positions.

8. The multi-way valve of claim 6, wherein the seal comprises polytetrafluoroethylene material.

9. The multiway valve of claim 1, wherein the multi-way valve further comprises a sealing system configured to seal between the valve rotor and the valve housing body, the sealing system including a biasing assembly configured to selectively apply a radial force on the valve rotor to urge the valve rotor toward the plurality of apertures formed in the valve housing body when the valve rotor is in one of the plurality of different predetermined positions to increase sealing between the valve rotor and the valve housing body.

10. The multi-way valve of claim 9, wherein the sealing system further includes a seal located radially between the valve rotor and the valve housing body that surrounds each of the plurality of apertures formed in the valve housing body.

11. The multi-way valve of claim 9, wherein the biasing assembly includes a ridge that extends radially inward from and axially along the annular outer wall of the valve housing and a plurality of protrusions that extend radially outward from the valve rotor and configured to engage the ridge on the valve housing body as the valve rotor rotates about the valve axis to the plurality of different predetermined positions.

12. A multi-way valve comprising a valve housing including a valve housing body and a housing end cover coupled to a first end of the valve housing body, the valve housing body shaped to define a valve cavity and a plurality of apertures that extend radially through the valve housing body and open into the valve cavity, and the housing end cover coupled to the first end of the valve housing to close an end opening to the valve cavity, and a valve flow controller includes a valve rotor arranged in the valve cavity of the valve housing body and configured to rotate relative to the valve housing body about a valve axis and an actuator coupled to the valve rotor to drive rotation of the valve rotor about the valve axis, wherein the valve rotor cooperates with the valve housing to define a plurality of flow paths when the valve rotor is rotated about the valve axis to a plurality of different predetermined positions to control a flow of fluid through the valve housing, wherein the valve housing body includes an annular outer wall that extends around the valve axis to define the valve cavity and a housing base that extends from the annular outer wall and formed to define the plurality of apertures that extend radially through the housing base relative to the valve axis, and wherein the multi-way valve further comprises a sealing system configured to seal between the valve rotor and the valve housing body, the sealing system including a biasing assembly configured to selectively apply a radial force on the valve rotor to urge the valve rotor toward the plurality of apertures formed in the valve housing body when the valve rotor is in one of the plurality of different predetermined positions to increase sealing between the valve rotor and the valve housing body.

13. The multi-way valve of claim 12, wherein the sealing system further includes a seal located radially between the valve rotor and the valve housing body that surrounds each of the plurality of apertures formed in the valve housing body.

14. The multi-way valve of claim 12, wherein the biasing assembly includes a ridge that extends radially inward from and axially along the annular outer wall of the valve housing and a plurality of protrusions that extend radially outward from the valve rotor and configured to engage the ridge on the valve housing body as the valve rotor rotates about the valve axis to the plurality of different predetermined positions.

* * * * *